(12) United States Patent
Nagatomi et al.

(10) Patent No.: US 7,916,612 B2
(45) Date of Patent: Mar. 29, 2011

(54) OPTICAL PICKUP APPARATUS AND FOCAL-POINT ADJUSTING METHOD

(75) Inventors: Kenji Nagatomi, Kaizu (JP); Katsutoshi Hibino, Kaidu (JP)

(73) Assignee: Sanyo Electric Co., Ltd., Osaka (JP)

( * ) Notice: Subject to any disclaimer, the term of this patent is extended or adjusted under 35 U.S.C. 154(b) by 61 days.

(21) Appl. No.: 12/512,416

(22) Filed: Jul. 30, 2009

(65) Prior Publication Data

US 2010/0027404 A1 Feb. 4, 2010

(30) Foreign Application Priority Data

Jul. 31, 2008 (JP) ................. 2008-198903

(51) Int. Cl.
*G11B 7/00* (2006.01)
(52) U.S. Cl. ........... 369/112.19; 369/112.12; 369/44.23; 369/112.03; 369/44.42
(58) Field of Classification Search ............. 369/112.19, 369/112.12
See application file for complete search history.

(56) References Cited

U.S. PATENT DOCUMENTS

| | | | | |
|---|---|---|---|---|
| 4,464,741 | A | * | 8/1984 | Compaan ................. 369/112.19 |
| 5,742,577 | A | * | 4/1998 | Horimai et al. .......... 369/112.19 |
| 6,594,221 | B2 | * | 7/2003 | Ogasawara ............... 369/112.19 |
| 6,967,908 | B2 | * | 11/2005 | Ogasawara et al. ........ 369/44.23 |
| 2008/0165655 | A1 | * | 7/2008 | Saitoh et al. ............. 369/109.01 |

FOREIGN PATENT DOCUMENTS

| | | |
|---|---|---|
| JP | 2006252716 A | 9/2006 |
| JP | 2006260669 A | 9/2006 |

* cited by examiner

*Primary Examiner* — Jorge Leonardo Ortiz Criado
(74) *Attorney, Agent, or Firm* — Ditthavong Mori & Steiner, P.C.

(57) ABSTRACT

An optical pickup apparatus includes an astigmatic element, an angle adjusting element for contradicting propagation directions of luminous fluxes within four different luminous flux regions out of a reflected light, a polarization adjusting element. Two of the luminous flux regions are placed in a direction in which aligned are a set of opposite angles made by the two mutually crossing straight lines respectively parallel to a first convergence direction and a second convergence direction vertical to the first convergence direction by the astigmatic element, and the remaining two luminous flux regions are placed in a direction in which an alternate set of opposite angles are aligned. The polarization adjusting element differentiates polarization directions of luminous fluxes which are selected out of the luminous fluxes within the four luminous flux regions and which are adjacent in a peripheral direction in which the optical axis of reflected light serves as an axis.

7 Claims, 21 Drawing Sheets

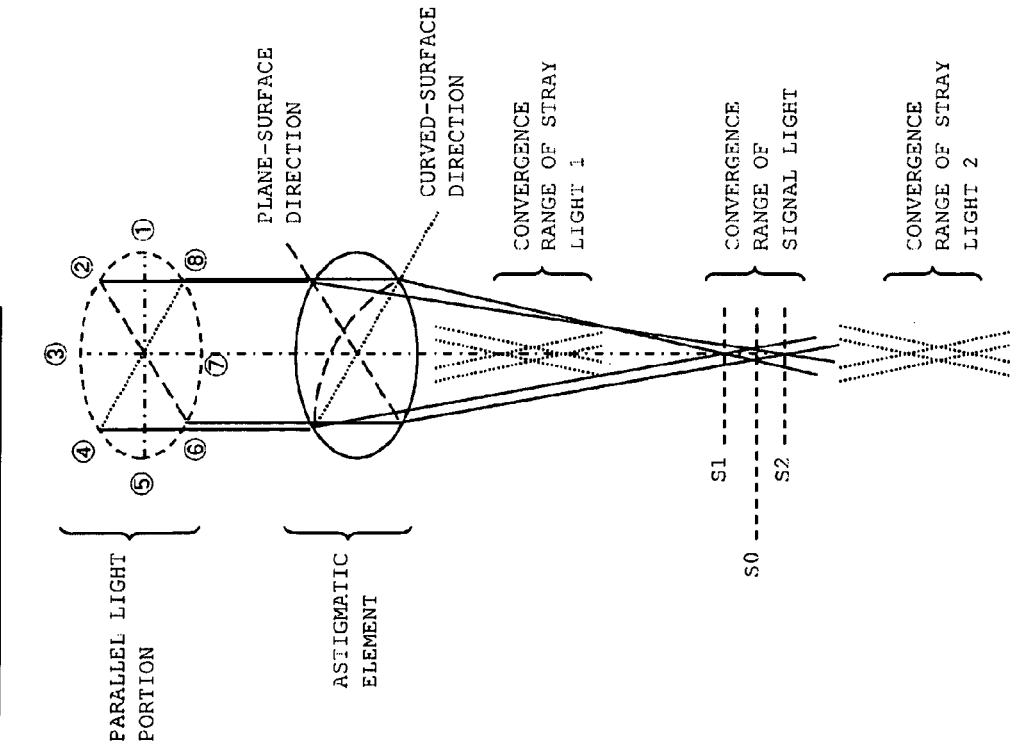
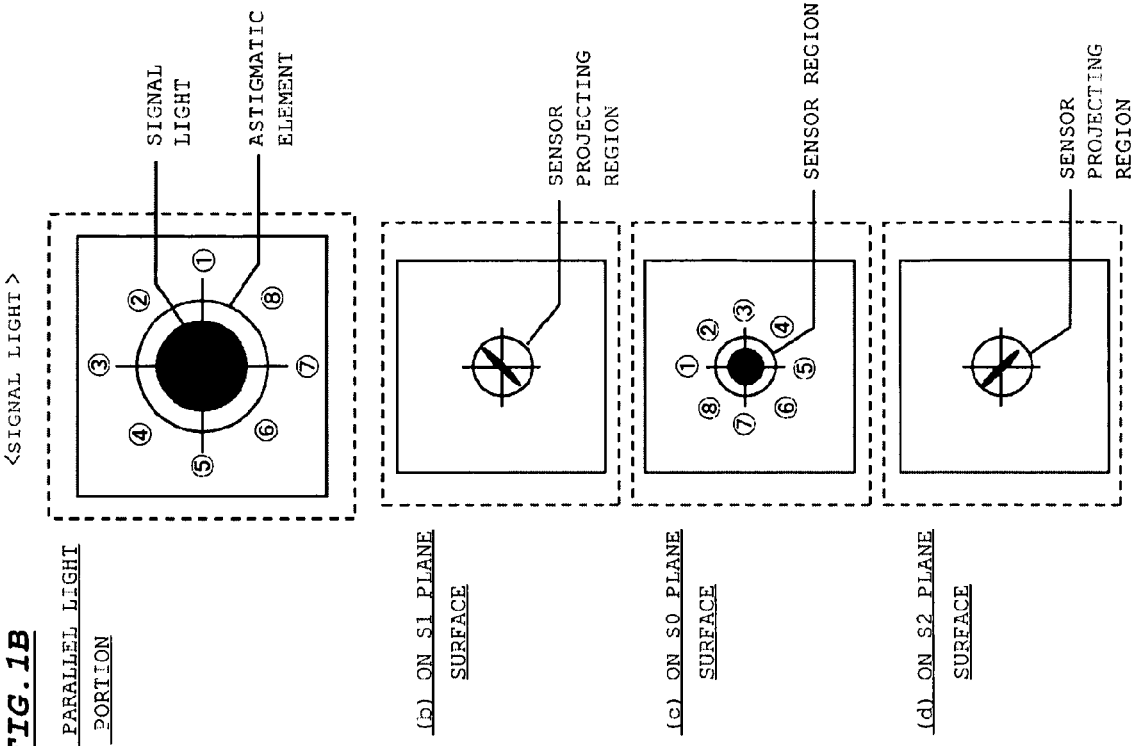

(a) PARALLEL LIGHT PORTION (b) ON S1 PLANE SURFACE (c) ON S0 PLANE SURFACE (d) ON S2 PLANE SURFACE

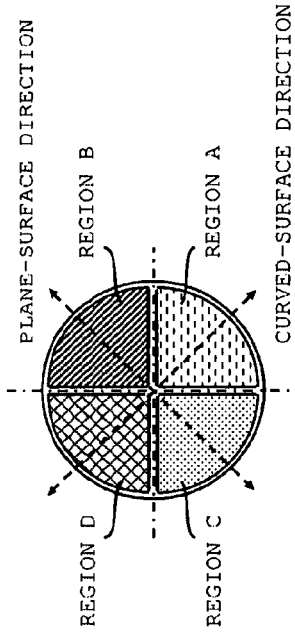
FIG.5A LUMINOUS FLUX SPLITTING PATTERN
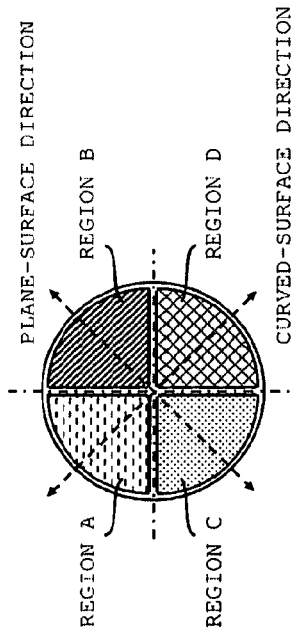
FIG.5B SIGNAL LIGHT
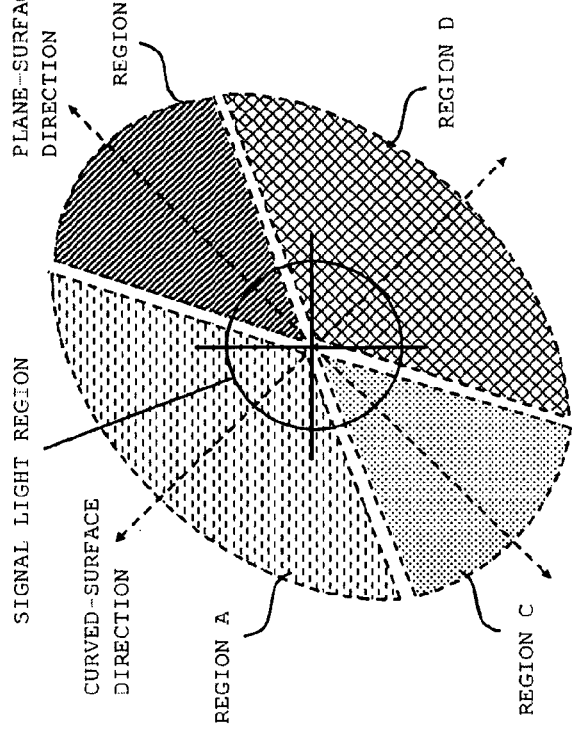
FIG.5D STRAY LIGHT 2
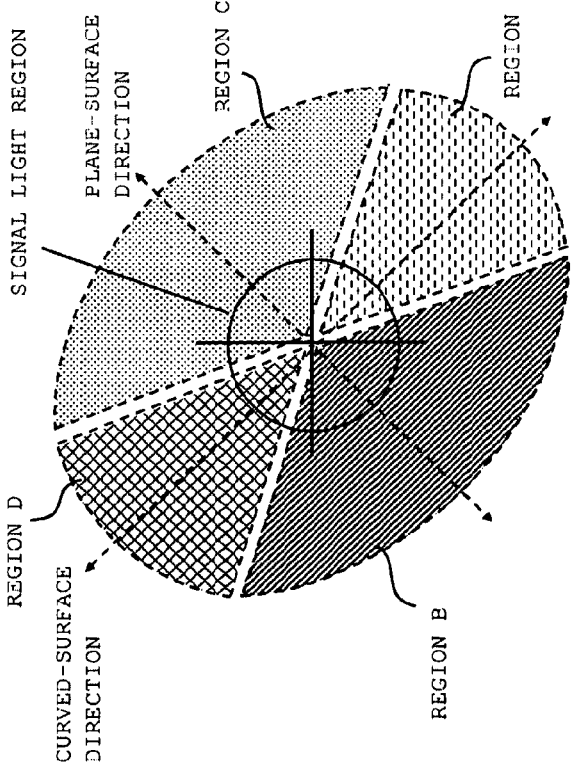
FIG.5C STRAY LIGHT 1

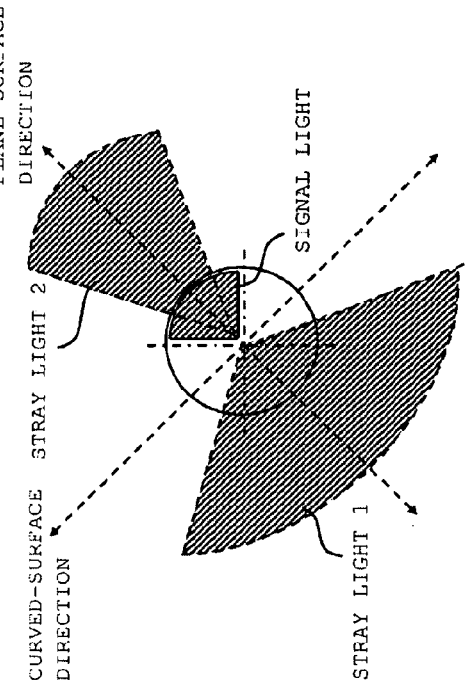
FIG. 6B  LUMINOUS FLUX STATE OF REGION B
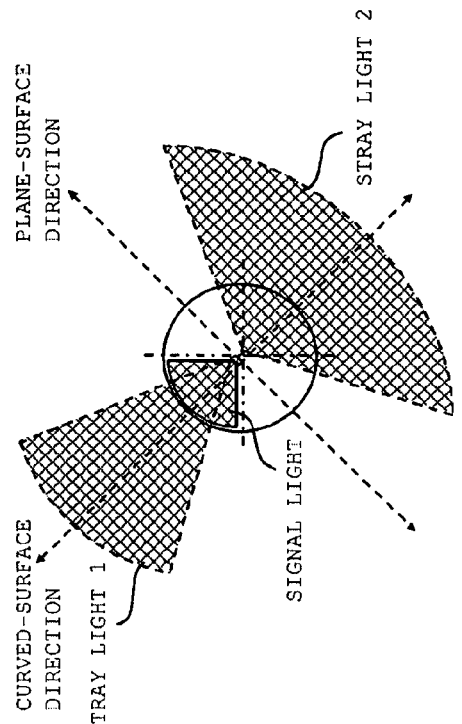
FIG. 6D  LUMINOUS FLUX STATE OF REGION D
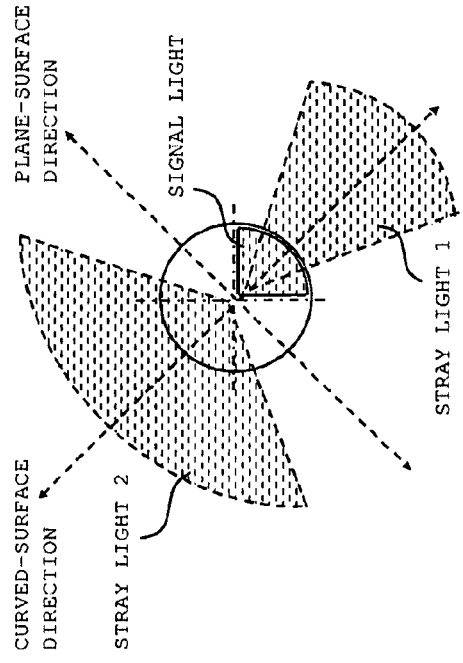
FIG. 6A  LUMINOUS FLUX STATE OF REGION A
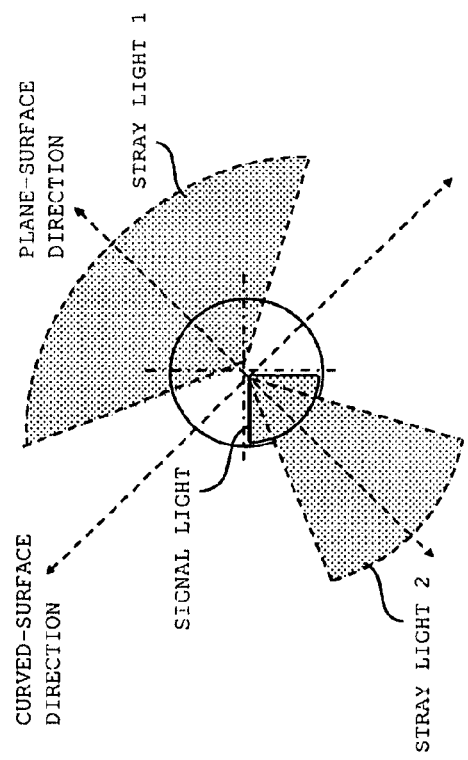
FIG. 6C  LUMINOUS FLUX STATE OF REGION C

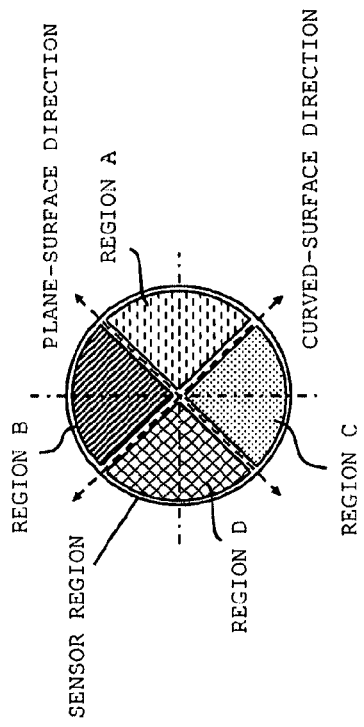
FIG. 7A   LUMINOUS FLUX SPLITTING PATTERN
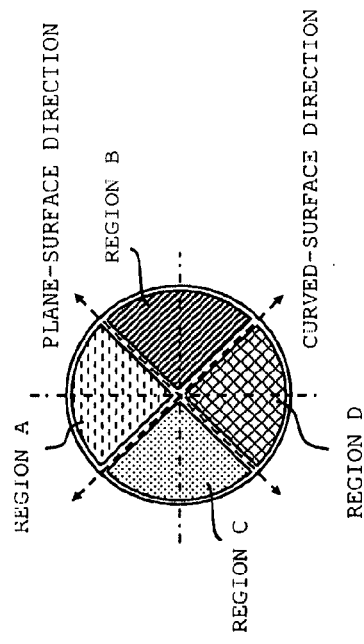
FIG. 7B   SIGNAL LIGHT
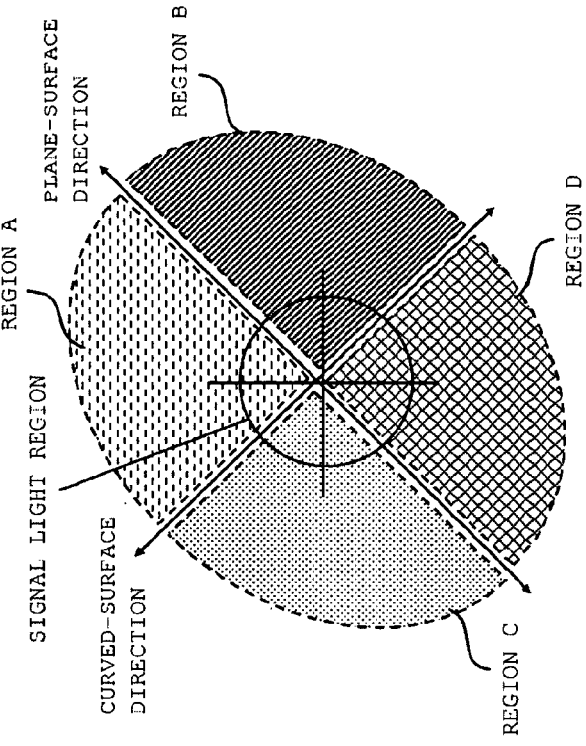
FIG. 7D   STRAY LIGHT 2
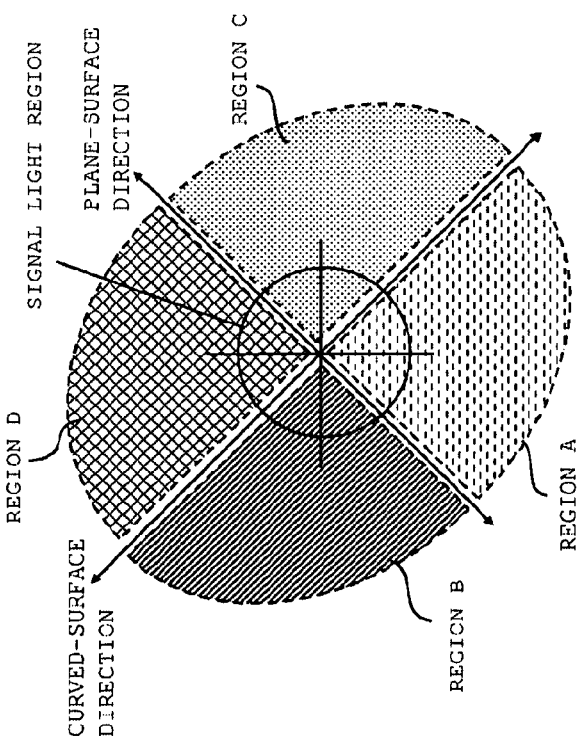
FIG. 7C   STRAY LIGHT 1

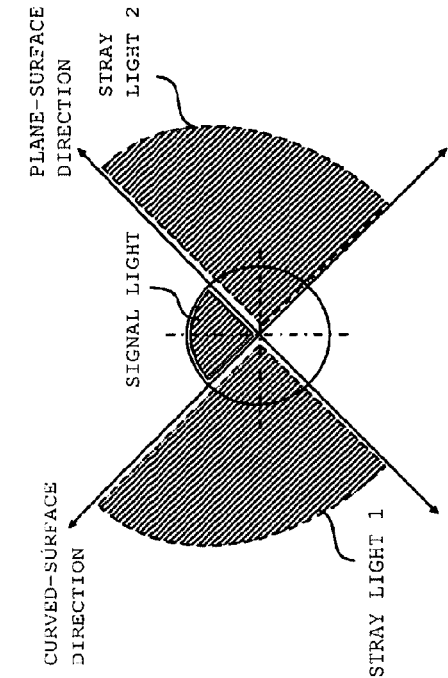
FIG. 8A  LUMINOUS FLUX STATE OF REGION A
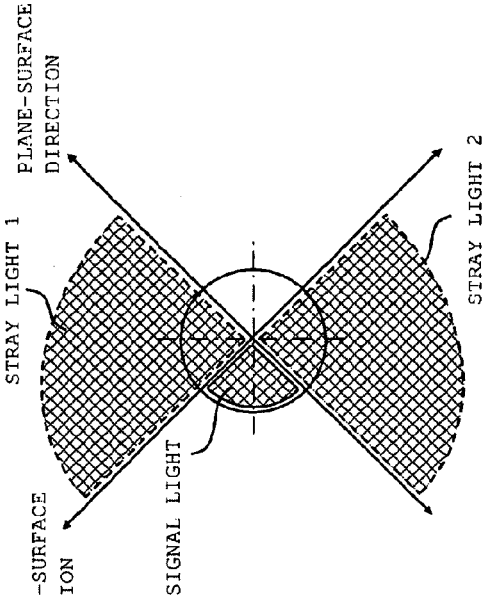
FIG. 8B  LUMINOUS FLUX STATE OF REGION B
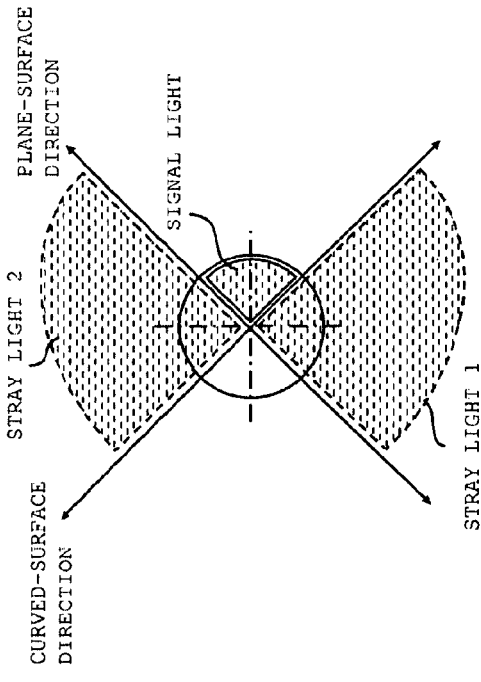
FIG. 8C  LUMINOUS FLUX STATE OF REGION C
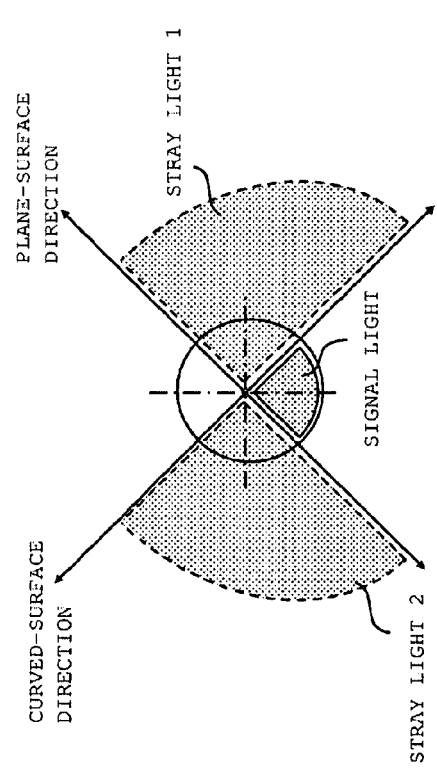
FIG. 8D  LUMINOUS FLUX STATE OF REGION D

ANGULAR PROVISION TO EACH REGION

LUMINOUS FLUX ON S0 PLANE SURFACE

FE = (A+B+E+F) - (C+D+G+H)
PP = (A+B+G+H) - (C+D+E+F)

FE = (A+B+E+F) - (C+D+G+H)
PP = (A+B+G+H) - (C+D+E+F)

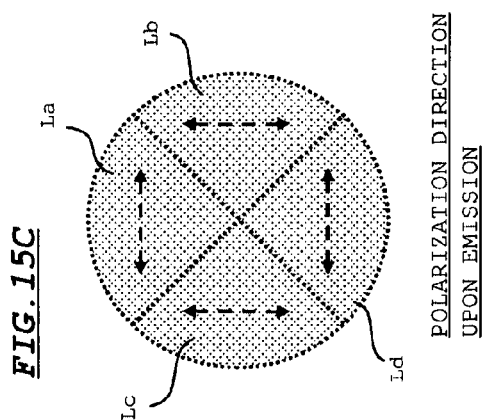
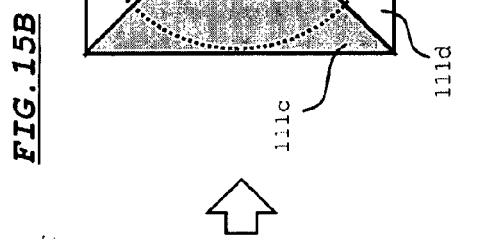
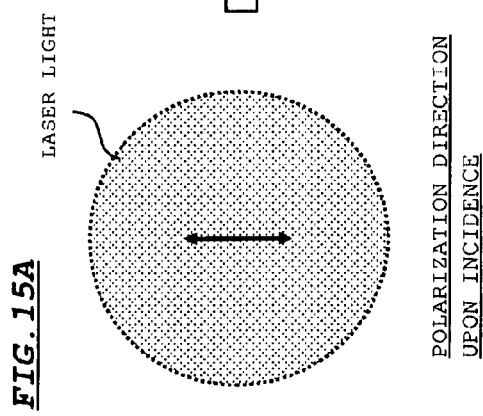
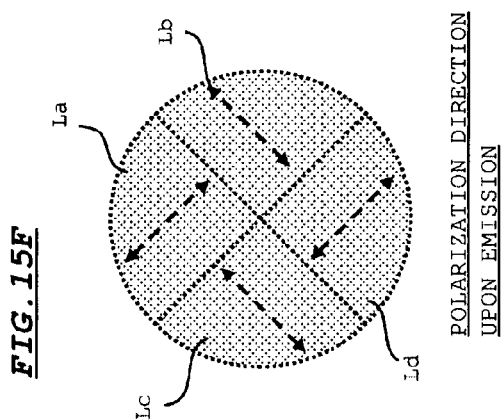
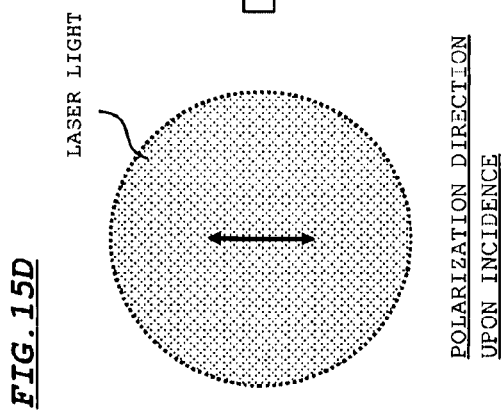

PP = (A+B+G+H) - (C+D+E+F)

PP = (A+B+G+H) - (C+D+E+F)

FE = (A+B+E+F) - (C+D+G+H)

FE = (A+B+E+F) - (C+D+G+H)

$PP = (A+B+G+H) - (C+D+E+F)$ $PP = (A+B+G+H) - (C+D+E+F)$ $FE = (A+B+E+F) - (C+D+G+H)$ $FE = (A+B+E+F) - (C+D+G+H)$

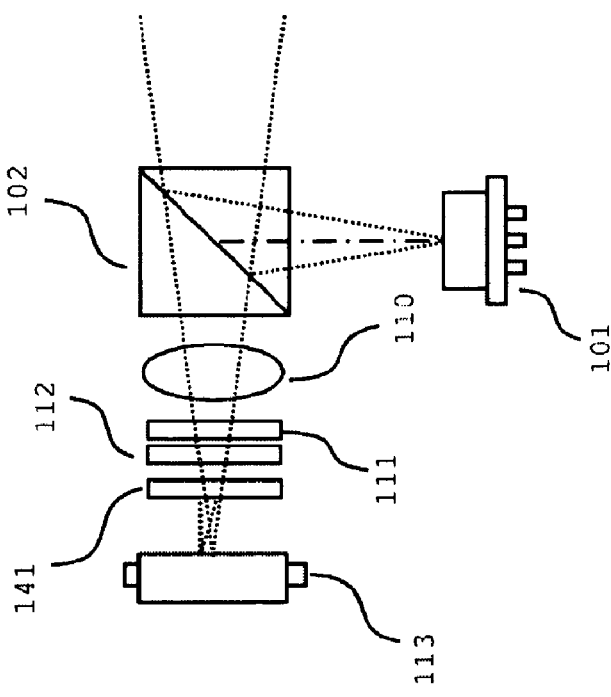
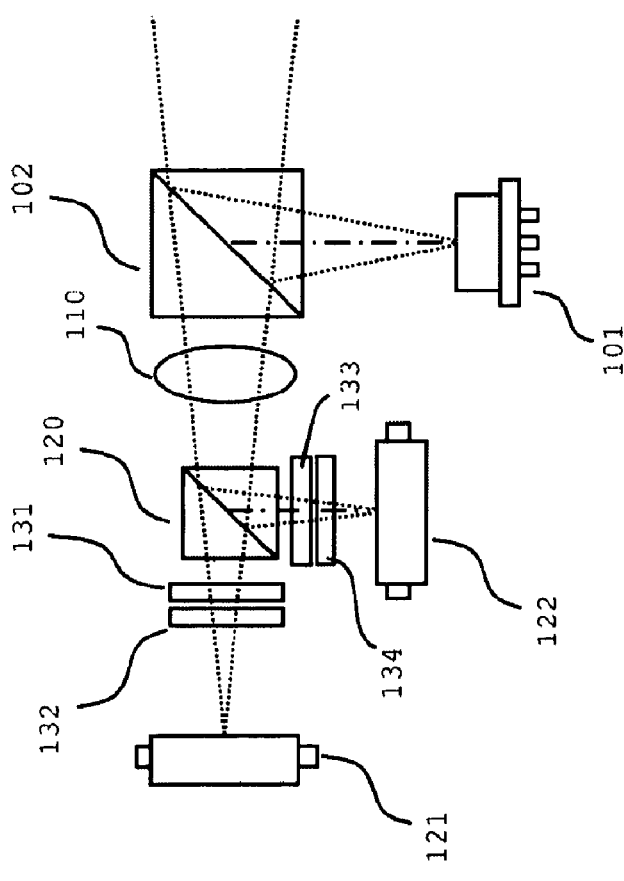
FIG. 21A
FIG. 21B

OPTICAL PICKUP APPARATUS AND FOCAL-POINT ADJUSTING METHOD

This application claims priority under 35 U.S.C. Section 119 of Japanese Patent Application No. 2008-198903 filed Jul. 31, 2008, entitled "OPTICAL PICKUP APPARATUS AND FOCAL-POINT ADJUSTING METHOD".

BACKGROUND OF THE INVENTION

1. Field of the Invention

The present invention relates to an optical pickup apparatus and a focal-point adjusting method, and more particularly, relates to an optical pickup apparatus and focal-point adjusting method suitable in use at the time of recording to and reproducing from a recording medium stacked thereon with a plurality of recording layers.

2. Description of the Related Art

In the recent years, along with the increased capacity of optical discs, the multilayered recording layers have been advanced. By including a plurality of recording layers in a single disc, the data capacity of the disc can be increased remarkably. When stacking the recording layers, the general practice until now has been to stack two layers on one side, but recently, to further advance the large capacity, disposing three or more recording layers on one side is also examined. Herein, when the number of recording layers to be stacked is increased, the large capacity of a disc can be promoted. However, on the other hand, the space between recording layers is narrowed, and signal degradation caused by crosstalk between layers increases.

If the recording layer is multilayered, a reflected light from the recording layer to be recorded or reproduced (target recording layer) becomes very weak. Therefore, when unnecessary reflected light (stray light) enters a photodetector from the recording layers present above and below the target recording layer, the detection signal is degraded, which may exert an adverse effect on a focus servo and a tracking servo. Therefore, when a large number of recording layers are disposed in this way, the stray light needs to be removed properly so as to stabilize the signals from the photodetector.

Herein, a method for removing the stray light includes that which uses a pinhole. In this method, a pinhole is disposed at a convergence position of the signal light. According to this method, a part of the stray light is intercepted by the pinhole, and therefore, the unnecessary stray light component entering the photodetector can be reduced. Another method for removing the stray light includes that which combines ½ wavelength plates and polarized light optical elements. According to this method, a polarization direction of the stray light is changed by the ½ wavelength plates, and the stray light is intercepted by the polarized light optical elements. Thus, the unnecessary stray light component entering the photodetector can be removed.

However, in the case of the method for removing the stray light by using a pinhole, the pinhole needs to be positioned accurately at the convergence position of a laser light (signal light) reflected from the target recording layer, and therefore, a task for adjusting the position of the pinhole is difficult, thus posing a problem. If the size of the pinhole is increased to facilitate the task for adjusting the position, the proportion of the stray light passing through the pinhole increases, and the signal degradation caused by the stray light cannot be inhibited effectively.

Furthermore, in the case of the method in which the ½ wavelength plates and the polarized light optical elements are combined to remove the stray light, apart from the fact that the ½ wavelength plates and the polarized light optical elements two each are needed to remove the stray light, a user needs to have two lenses, which increases the number of components and the cost, and adjusting the placement of each component is a complex process, thus posing a problem. Furthermore, the user needs to have a space for placing and arraying these components, which results in the enlargement of the optical system, thus posing a problem.

SUMMARY OF THE INVENTION

An optical pickup apparatus according to a first aspect of the present invention is provided with: a laser light source; an objective lens for converging laser light emitted from the laser light source onto a recording medium; and an astigmatic element for introducing an astigmatism into the laser light reflected by the recording medium. The astigmatic element mutually spaces a first focal line position occurring by the convergence of the laser light in a first direction and a second focal line position occurring by the convergence of the laser light in a second direction vertical to the first direction, into a propagation direction of the laser light. Moreover, the optical pickup apparatus is provided with: an angle adjusting element for mutually contradicting propagation directions of luminous fluxes, out of the laser light reflected by the recording medium, within four different luminous flux regions so that the luminous fluxes within the four luminous flux regions are mutually dispersed; a photodetector for outputting a detection signal when receiving each of the dispersed luminous fluxes; and a polarization adjusting element for adjusting a polarization direction of the luminous fluxes within the four luminous flux regions. When an intersection point of two mutually crossing straight lines respectively parallel to the first direction and the second direction is matched to an optical axis of the laser light, the angle adjusting element sets the four luminous flux regions so that two of the luminous flux regions are placed in a direction in which a set of opposite angles made by the two straight lines are aligned and remaining two luminous flux regions are placed in a direction in which an alternate set of opposite angles are aligned. The polarization adjusting element mutually differentiates polarization directions of luminous fluxes which are selected out of the luminous fluxes within the four luminous flux regions and which are adjacent in a peripheral direction in which the optical axis of laser light serves as an axis.

A second aspect of the present invention relates to a focal-point adjusting method for positioning a focal point position of an irradiation light on a target surface. The focal-point adjusting method comprises: introducing an astigmatism into the irradiation light reflected by the target surface so that a first focal line position occurring by the convergence of the irradiation light in a first direction and a second focal line position occurring by the convergence of the irradiation light in a second direction vertical to the first direction are mutually spaced in a propagation direction of the irradiation light; mutually contradicting propagation directions of luminous fluxes, out of the irradiation light reflected by the target surface, within four different luminous flux regions so that the luminous fluxes within the four luminous flux regions are mutually dispersed; receiving each of the dispersed luminous fluxes in a photodetector; and producing a focus error signal by performing an arithmetic process based on an astigmatic method, on a detection signal outputted from the photodetector. When an intersection point of two mutually crossing straight lines respectively parallel to the first direction and the second direction is matched to an optical axis of the irradiation light, the four luminous flux regions are so set that two of the luminous flux regions are placed in a direction in which a set of opposite angles made by the two straight lines are aligned and remaining two luminous flux regions are placed in a direction in which an alternate set of opposite angles are aligned, and polarization directions of luminous fluxes which are selected out of the luminous fluxes within the four luminous flux regions and which are adjacent in a peripheral direction in which the optical axis of laser light serves as an axis are mutually differentiated.

BRIEF DESCRIPTION OF THE DRAWINGS

The above and other objects and novel features of the present invention will become more completely apparent from the description of the embodiment below taken with the following accompanying drawings.

FIGS. 1A and 1B are diagrams each describing a technical principle (a manner in which a light ray advances) according to an embodiment.

FIGS. 5A to 5D are diagrams each describing the technical principle (a splitting pattern and a distribution of a luminous flux) according to the embodiment.

FIGS. 6A to 6D are diagrams each describing the technical principle (a splitting pattern and a distribution of a luminous flux) according to the embodiment.

FIGS. 7A to 7D are diagrams each describing the technical principle (a splitting pattern and a distribution of a luminous flux) according to the embodiment.

FIGS. 8A to 8D are diagrams each describing the technical principle (a splitting pattern and a distribution of a luminous flux) according to the embodiment.

FIGS. 15A to 15F are diagrams each showing an optical system of a polarization adjusting element according to the embodiment.

FIGS. 21A and 21B are diagrams each showing a modified example (modified example of the optical system) of the embodiment.

Figure 2B:
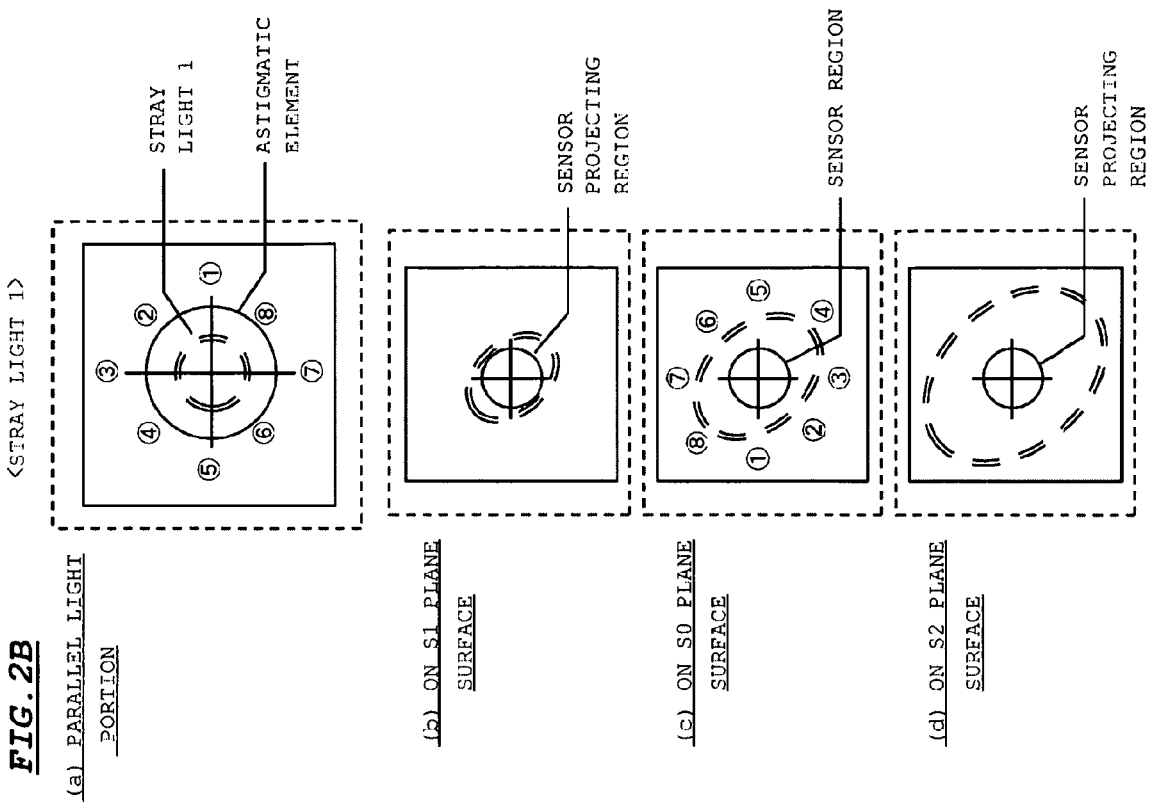
FIGS. 2A and 2B are diagrams each describing the technical principle (a manner in which a light ray advances) according to the embodiment.
Figure 2A:
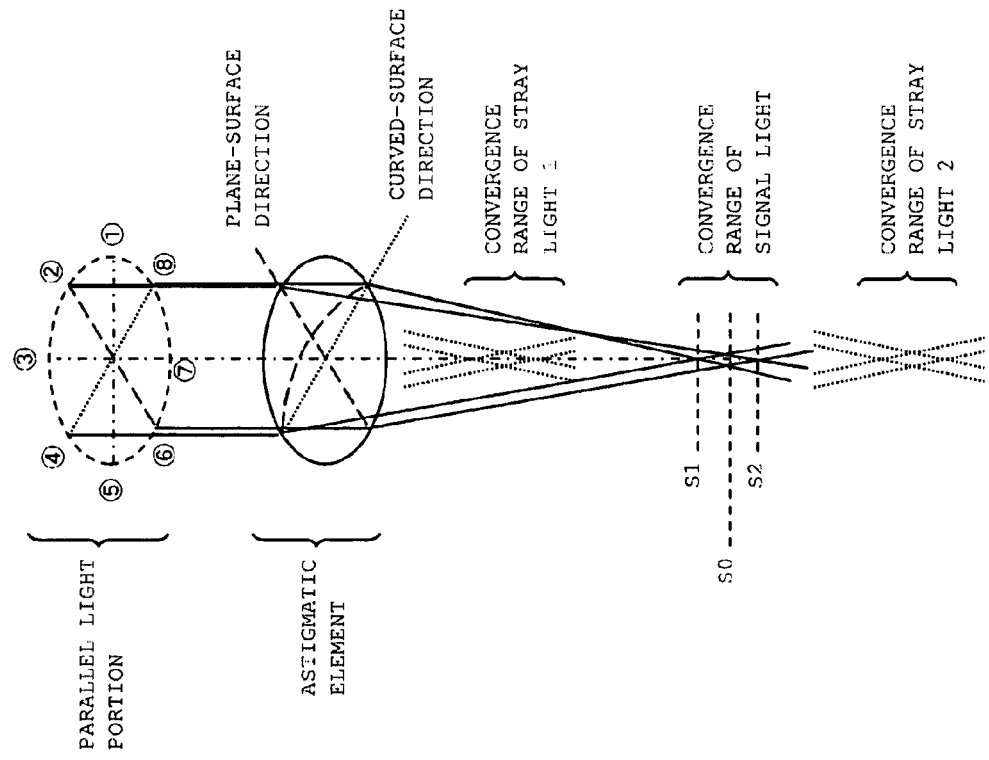

However, the diagrams are for the purposes of illustration only, and are not intended to limit the scope of the present invention.

DESCRIPTION OF THE PREFERRED EMBODIMENTS

An embodiment of the present invention will be described below with reference to the drawings.

Technical Principle

Firstly, with reference to FIG. 1A to FIG. 10D, a technical principle applied to this embodiment will be described.

FIG. 1A is a diagram showing a convergence state of a signal light and a stray light, when the laser light (signal light) reflected by a target recording layer enters an astigmatic element, such as an anamorphic lens, in a state of a parallel light. A "stray light 1" is a laser light reflected by a recording layer present on a farther side by one layer than the target recording layer when seen from the side of a laser-light entering surface, and a "stray light 2" is a laser light reflected by a recording layer present on a nearer side by one layer than the target recording layer. FIG. 1A also shows a state when the signal light is focused on the target recording layer.

As illustrated, because of the effect of an anamorphic lens, a focal line occurs on a surface S1 due to the convergence of the signal light in a "curved-surface direction" shown in FIG. 1, and furthermore, a focal line occurs on a surface S2 due to the convergence of the signal light in a "plane-surface direction" shown in FIG. 1, which is vertical to the curved-surface direction. Thus, a spot of the signal light becomes minimum (circle of least confusion) on a surface S0 between the surfaces S1 and S2. In the case of a focus adjustment based on an astigmatic method, the surface S0 is situated as a light-receiving surface of a photodetector. It should be noted that in order to simplify the description of the astigmatic effect in the anamorphic lens, the "curved-surface direction" and the "plane-surface direction" are simply expressed for the sake of convenience, and in reality, it suffices that the effect for connecting the focal lines in positions different to each other occurs by the anamorphic lens. In this case, the anamorphic lens may also have a curvature in the "plane-surface direction" shown in FIG. 1A.

As shown in FIG. 1A, a focal line position of the stray light 1 (in FIG. 1A, a range between the two focal line positions by the astigmatic element is shown as a "convergence range") is closer to the astigmatic element as compared to the focal line position of the signal light, while a focal line position of the stray light 2 is further away from the astigmatic element as compared to the focal line position of the signal light.

FIGS. 1B(a) to 1B(d) are diagrams each showing a beam shape of the signal light in the parallel light portion and on the surfaces S1, S0, and S2, respectively. The signal light that has been entered on the astigmatic element in a true circle becomes elliptical on the surface S1, then after becoming a substantially true circle on the surface S0, it again becomes elliptical on the surface S2. Herein, the beam shapes formed on the surface S1 and on the surface S2, the respective long axes are vertical to each other.

As shown in FIGS. 1A and 1B(a), if eight positions (Positions 1 to 8: written by encircled numeric figures in FIGS. 1A and 1B) are set up in the anti-clockwise direction on the outer circumference of the beam in the parallel light portion, a light ray passing through the positions 1 to 8 each experiences convergence effect by the astigmatic element. The position 4 and the position 8 are positioned on a parting line when a beam cross section of the parallel light portion is split into two by a parallel straight line in the curved-surface direction, while the position 2 and the position 6 are positioned on a parting line when the beam cross section of the parallel light portion is split into two by a parallel straight line in the plane-surface direction. The Positions 1, 3, 5, and 7 are in the middle of the outer circular arc sectioned by the positions 2, 4, 6, and 8, respectively.

The light ray passing through the position 4 and the position 8 in the parallel light portion enters the surface S0 after being converged to the focal line in the curved-surface direction on the surface S1. Thus, the light ray passing through these positions 4 and 8 passes through the positions 4 and 8 shown in FIG. 1B(c), on the surface S0. Similarly, the light ray passing through the positions 1, 3, 5, and 7 in the parallel light portion also enters the surface S0 after being converged to the focal line in the curved-surface direction on the surface S1, and as a result, the light ray passes through the positions 1, 3, 5, and 7 shown in FIG. 1B(c), on the surface S0. In contrast to this, the light ray passing through the positions 2 and 6 in the parallel light portion enters the surface S0 without being converged to the focal line in the curved-surface direction, on the surface S1. Thus, the light ray passing through these positions 2 and 6 passes through the positions 2 and 6 shown in FIG. 1B(c), on the surface S0.

FIGS. 2B(a) to 2B(d) are diagrams each showing beam shapes and light ray passage positions of the stray light 1 in the parallel light portion and on the surfaces S1, S0, and S2, respectively. As shown in FIG. 2B(a), similar to the case of the aforementioned signal light, if eight positions 1 to 8 are set up on the outer circumference of the stray light 1, the light ray passing through these eight positions 1 to 8 enters on the surface S0 after being converged either to the focal line in the curved-surface direction or to the focal line in the plane-surface direction. Thus, the light ray passing through the positions 1 to 8 in the parallel light portion respectively passes through the positions 1 to 8 shown in FIG. 2B(c), on the surface S0.

Figure 3B:
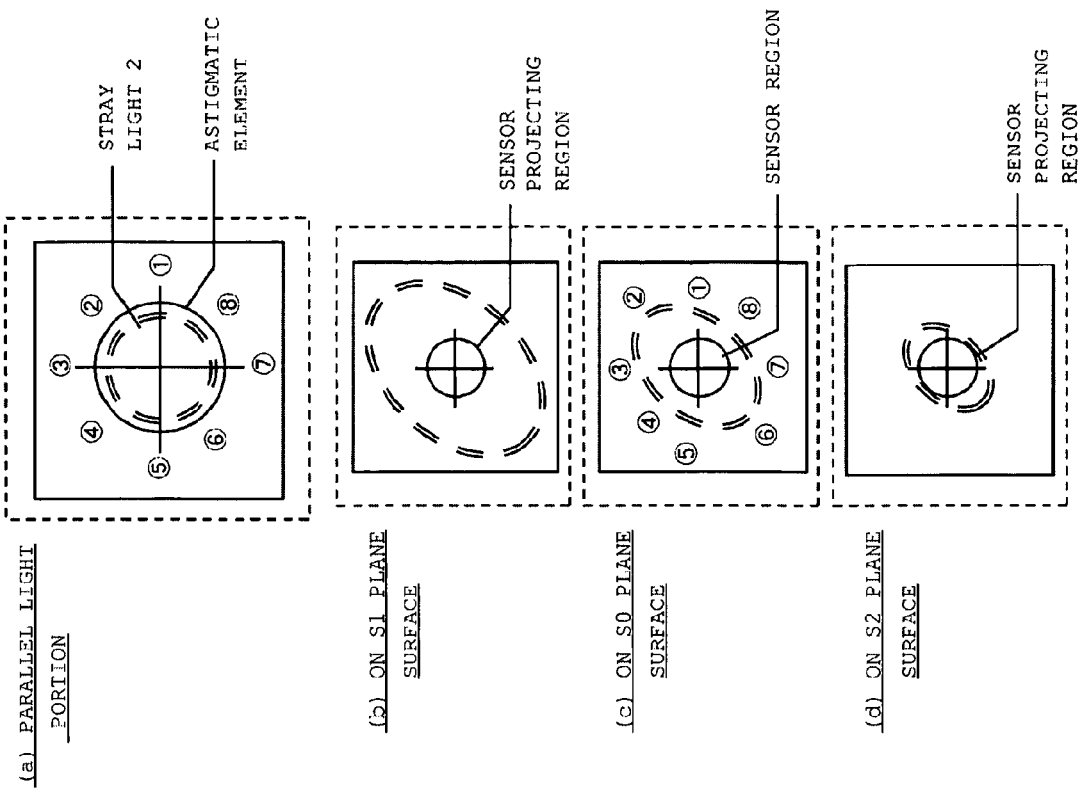
FIGS. 3A and 3B are diagrams each describing the technical principle (a manner in which a light ray advances) according to the embodiment.
Figure 3A:
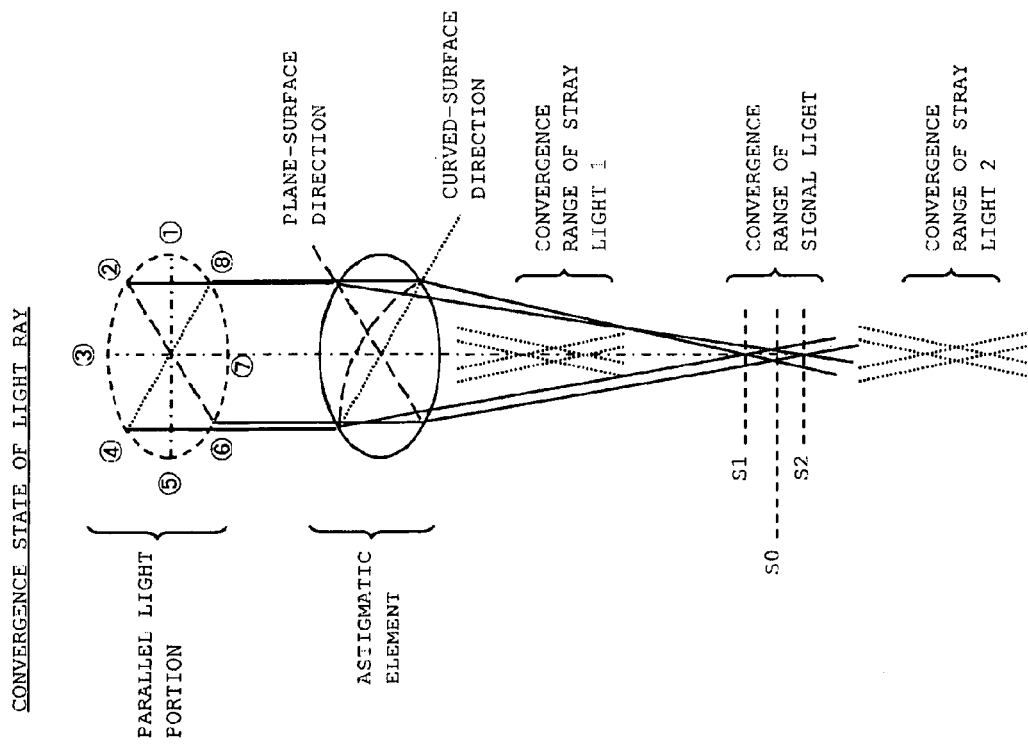

FIGS. 3B(a) to 3B(d) are diagrams each showing beam shapes and light ray passage positions of the stray light 2 in the parallel light portion and on the surfaces S1, S0, and S2, respectively. As shown in FIG. 3B(a), similar to the case of the aforementioned signal light, if eight positions 1 to 8 are set up on the outer circumference of the stray light 2, the light ray passing through these eight positions enters the surface S0 without being converged either to the focal line in the curved-surface direction or to the focal line in the plane-surface direction. Thus, the light ray passing through the positions 1 to 8 in the parallel light portion respectively passes through the positions 1 to 8 shown in FIG. 3B(c), on the surface S0.

Figure 4:
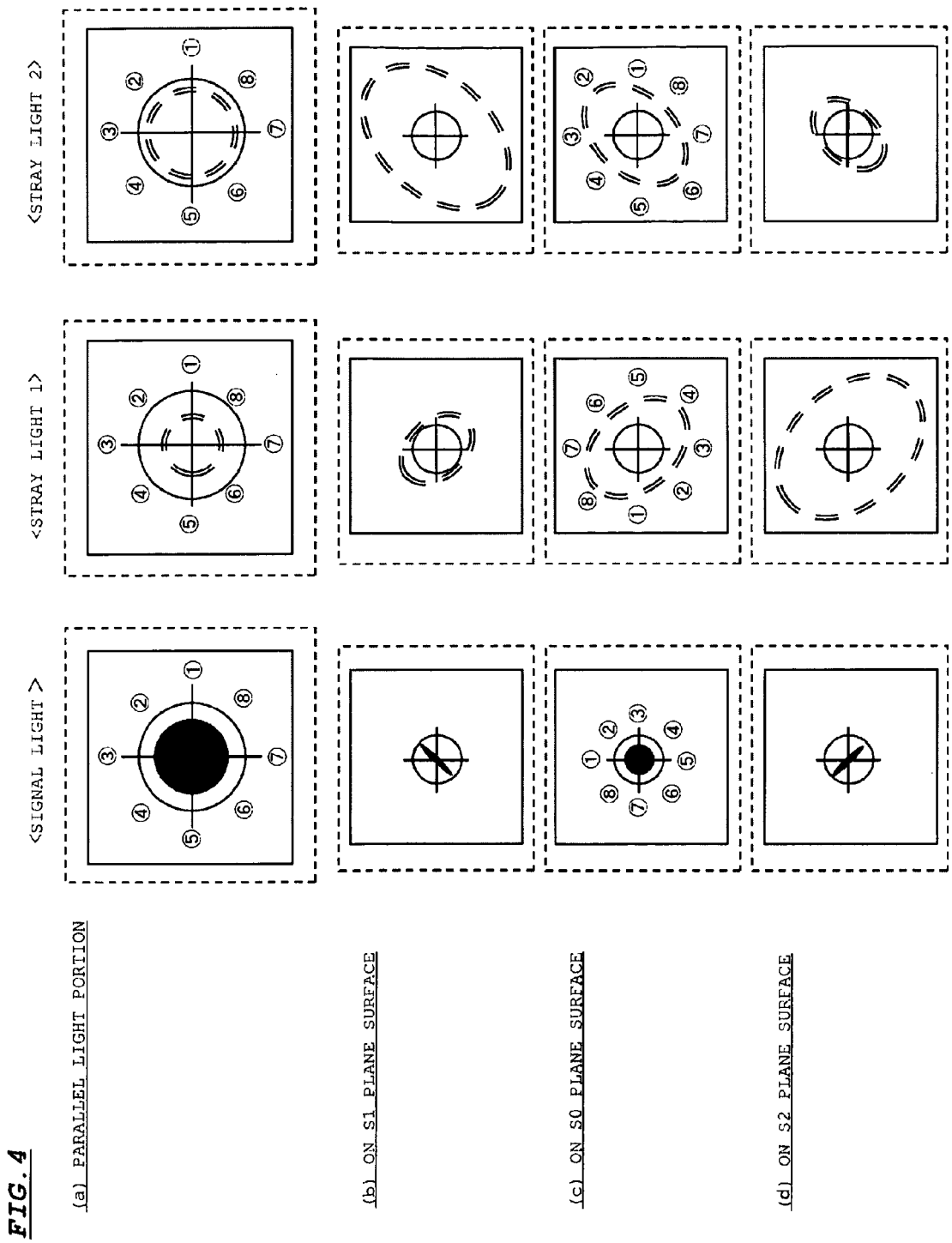
FIG. 4 is a diagram describing the technical principle (a manner in which a light ray advances) according to the embodiment.

FIG. 4 is a diagram in which the beam shapes and the light ray passage positions in the parallel light portion and on the surfaces S1, S0, and S2, described above, are shown by comparing among the signal light, the stray light 1, and the stray light 2. As can be understood by comparing rows shown in FIG. 4(c), luminous fluxes of the signal light, the stray light 1, and the stray light 2 passing through the position 1 in the parallel light portion pass through outer circumference positions different to one another, on the surface S0. Similarly, also the luminous fluxes of the signal light, the stray light 1, and the stray light 2 passing through the positions 3, 4, 5, 7, and 8 in the parallel light portion pass through outer circumference positions different to one another, on the surface S0. The luminous fluxes of the signal light and the stray light 2 passing through the positions 2 and 6 in the parallel light portion pass through the same outer circumference position on the surface S0. Also in this case, the luminous fluxes of the signal light and the stray light 1 passing through the positions 2 and 6 in the parallel light portion pass through outer circumference positions different to one another on the surface S0, and the luminous fluxes of the stray light 1 and the stray light 2 passing through the positions 2 and 6 in the parallel light portion pass through outer circumference positions different to one another on the surface S0.

Subsequently, in consideration of the phenomenon, a relationship between region splitting patterns of the signal light and the stray lights 1 and 2 in the parallel light portion, and irradiating regions of the signal light and the stray lights 1 and 2 on the surface S0 will be examined.

Firstly, as shown in FIG. 5A, the signal light and the stray lights 1 and 2 in the parallel light portion are split by two straight lines inclined at 45 degrees relative to the plane-surface direction and the curved-surface direction, to form four sections, i.e., luminous flux regions A to D. It should be noted that this splitting pattern corresponds to a region split based on the conventional astigmatic method.

In this case, based on the aforementioned phenomenon, the signal light of the luminous flux regions A to D is distributed on the surface S0 as shown in FIG. 5B. Furthermore, based on the aforementioned phenomenon, the stray light 1 and stray light 2 in the luminous flux regions A to D are distributed as shown in FIGS. 5C and 5D, respectively.

Herein, if the signal light and the stray lights 1 and 2 on the surface S0 are extracted for each luminous flux region, the distribution of each light will be as shown in FIGS. 6A to 6D. In such a case, either one of the stray light 1 or the stray light 2 in the same luminous flux region overlaps the signal light in each luminous flux region all the time. Therefore, if the signal light in each luminous flux region is received by a sensor pattern on a photodetector, at least the stray light 1 or the stray light 2 in the same luminous flux region will simultaneously enter the corresponding sensor pattern, thus causing a degradation of the detection signal.

In contrast to this, as shown in FIG. 7A, the signal light and the stray lights 1 and 2 in the parallel light portion are split by two straight lines parallel to the plane-surface direction and the curved-surface direction, to form four sections, i.e., luminous flux regions A to D. In such a case, based on the aforementioned phenomenon, the signal light of the luminous flux regions A to D is distributed on the surface S0 as shown in FIG. 7B. Furthermore, based on the aforementioned phenomenon, the stray light 1 and the stray light 2 of the luminous flux regions A to D are distributed as shown in FIGS. 7C and 7D, respectively.

Herein, if the signal light and the stray lights 1 and 2 on the surface S0 are extracted for each luminous flux region, the distribution of each light will be as shown in FIGS. 8A to 8D. In such a case, neither the stray light 1 nor the stray light 2 in the same luminous flux region overlaps the signal light in each luminous flux region. Therefore, after scattering the luminous fluxes (the signal light, and the stray lights 1 and 2) within each luminous flux region in different directions, if the configuration is such that only the signal light is received by the sensor pattern, only the signal light will enter the corresponding sensor pattern, and the entry of the stray light can be inhibited. Thus, the degradation of the detection signal due to the stray light can be avoided.

As described above, the signal light and the stray lights 1 and 2 are split into the four luminous flux regions A to D by two straight lines parallel to the plane-surface direction and the curved-surface direction, and by dispersing the light passing through these luminous flux regions A to D, and then alienating it on the surface S0, it becomes possible to extract only the signal light. The embodiment is based on this principle.

Figure 9A:
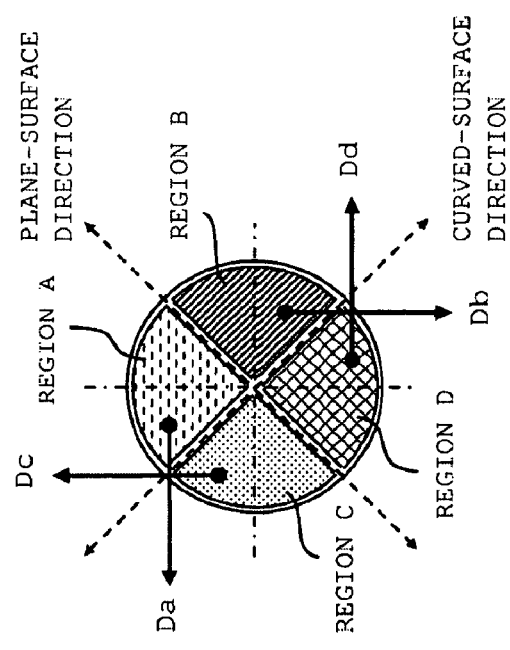
FIGS. 9A and 9B are diagrams each describing the technical principle (an angular provision and a distribution of a luminous flux) according to the embodiment.
Figure 9B:
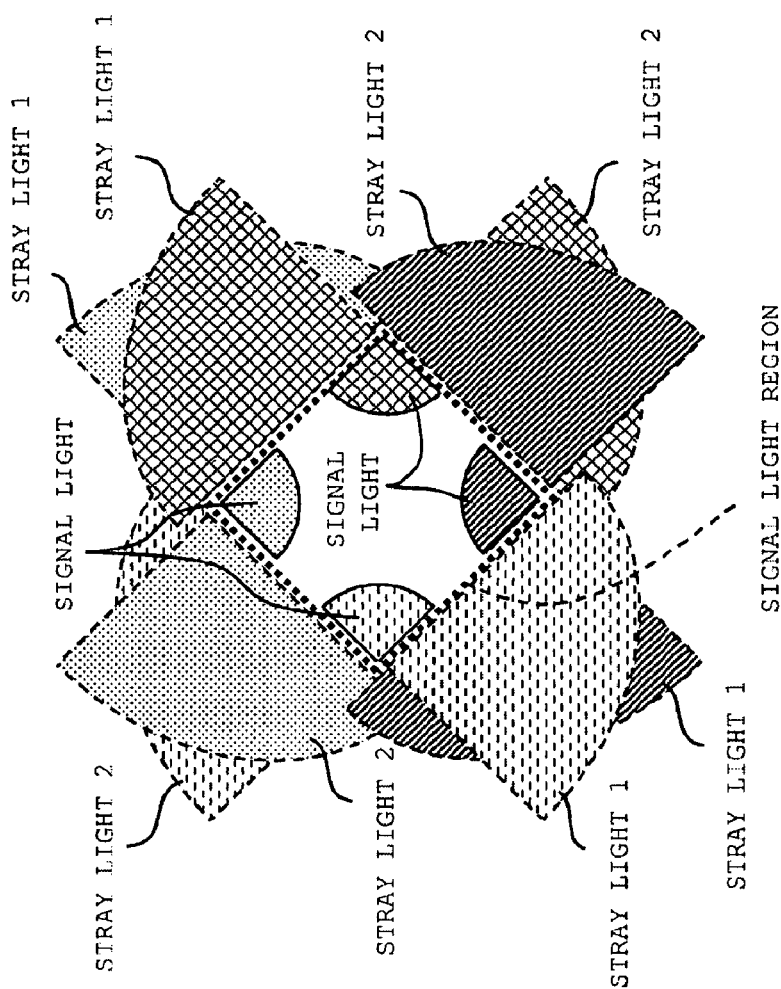

FIGS. 9A and 9B are diagrams each showing distribution states of the signal light and the stray lights 1 and 2 on the surface S0, when advancing directions of the luminous fluxes (the signal light, and the stray lights 1 and 2) passing through the four luminous flux regions A to D shown in FIG. 7A are changed by the same angle in the respectively different directions. Herein, as shown in FIG. 9A, the advancing directions of the luminous fluxes (the signal light, and the stray lights 1 and 2) passing through the luminous flux regions A to D are changed by the same angular amount α (not shown) in the directions Da, Db, Dc, and Dd, respectively. Each of the directions Da, Db, Dc, and Dd are inclined at 45 degrees relative to the plane-surface direction and the curved-surface direction.

In such a case, by regulating the angular amount α in the directions Da, Db, Dc, and Dd, the signal light and the stray lights 1 and 2 in each luminous flux region can be distributed on the plane surface S0, as shown in FIG. 9B. As a result, as shown in FIG. 9B, a signal light region containing only the signal light can be set up on the plane surface S0. By setting a sensor pattern of the photodetector in this signal light region, only the signal light of each region can be received by the corresponding sensor pattern.

Figure 10A:
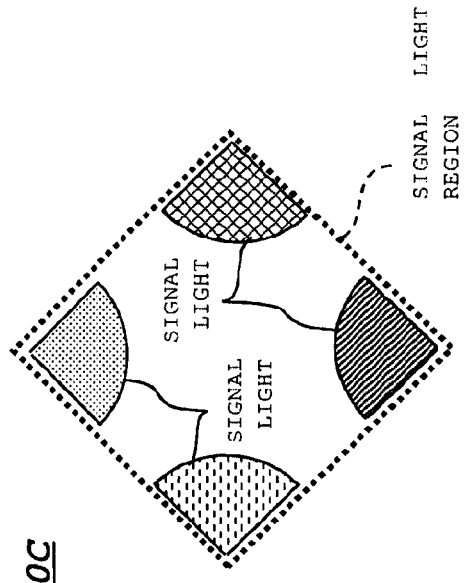
FIGS. 10A to 10D are diagrams each describing a method for placing a sensor pattern according to the embodiment.
Figure 10B:
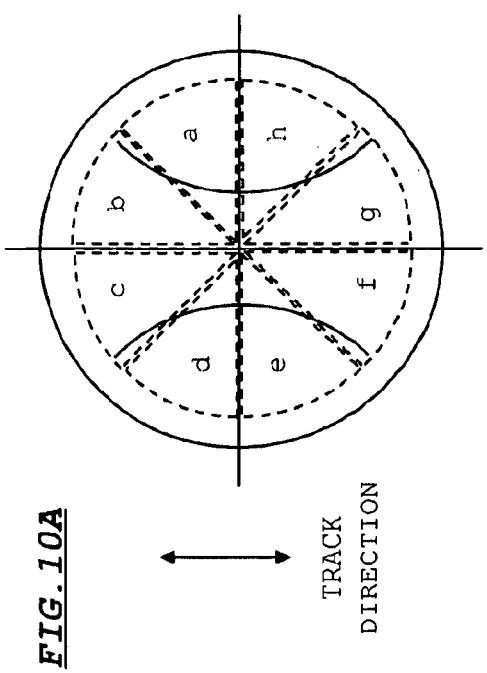
Figure 10C:
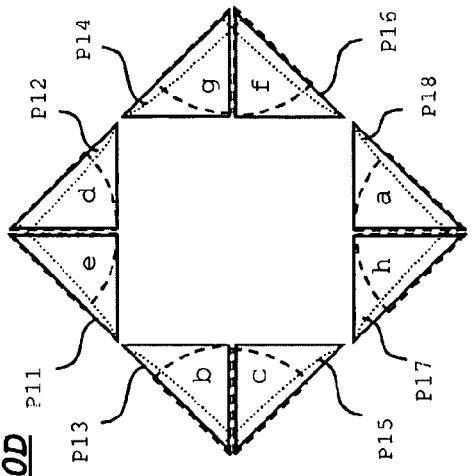
Figure 10D:
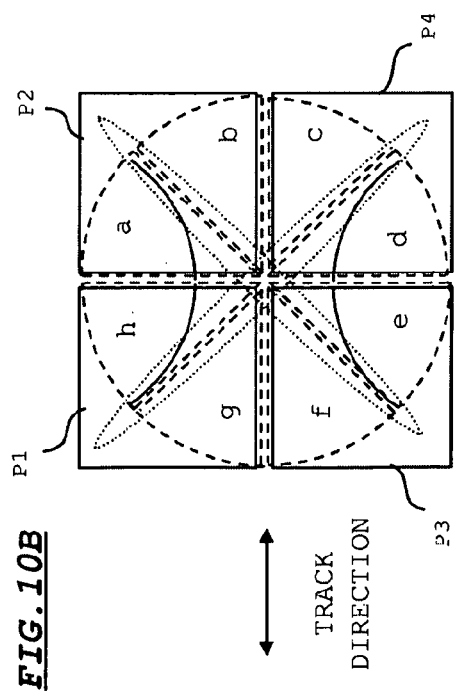

FIGS. 10A to 10D are diagrams each describing a method for placing the sensor pattern. FIGS. 10A and 10B are diagrams each showing a splitting method of the luminous flux and the sensor pattern based on the conventional astigmatic method, while FIGS. 10C and 10D are diagrams each showing a splitting method of the luminous flux and the sensor pattern based on the aforementioned principle. Herein, a track direction has an inclination of 45 degrees relative to a planar direction and a curvature direction. In FIGS. 10A and 10B, for illustration purposes, the luminous flux is sectioned into eight luminous flux regions a to h. Furthermore, the diffracted image due to the track groove is shown by the solid line and the shape of the beam when off focus is shown by the dotted line.

In the conventional astigmatic method, sensor patterns P1 to P4 (quadratic sensor) of a photodetector are set as shown in FIG. 10B. In such a case, if detection signal components based on the light intensity of the luminous flux regions a to h are represented by A to H, a focus error signal FE is evaluated by an arithmetic operation of: FE=(A+B+E+F)−(C+D+G+H), and a push-pull signal PP is evaluated by an arithmetic operation of PP=(A+B+G+H)−(C+D+E+F).

In contrast to this, in the case of the distribution state in FIG. 9B, as described above, the signal light is distributed within the signal light region according to the state shown in FIG. 10C. In such a case, if the distribution of the signal light passing through the luminous flux regions a to h shown in FIG. 10A is overlapped on the distribution shown in FIG. 10C, a distribution as shown in FIG. 10D results. That is, the signal light passing through the luminous flux regions a to h in FIG. 10A is guided into the luminous flux regions a to h shown in FIG. 10D, on the surface S0 on which the sensor pattern of the photodetector is installed.

Therefore, if the sensor patterns P11 to P18 that are shown to be overlapped in FIG. 10D are set to the positions of the luminous flux regions a to h shown in FIG. 10D, the focus error signal and push-pull signal can be generated by the same arithmetic process as that in FIG. 10B. That is, also in this case, if the detection signals from the sensor patterns receiving the luminous flux of the luminous flux regions a to h are represented by A to H, similar to the case in FIG. 10B, the focus error signal FE can be acquired by an arithmetic operation of FE=(A+B+E+F)−(C+D+G+H), and the push-pull signal PP can be acquired by an arithmetic operation of PP=(A+B+G+H)−(C+D+E+F).

As described above, according to this principle, if the signal light and the stray lights 1 and 2 in the parallel light portion are split into the four luminous flux regions A to D by two straight lines parallel to the plane-surface direction and the curved-surface direction shown in FIG. 1A, and the light passing through these luminous flux regions A to D is dispersed, and the dispersed signal light in each luminous flux region A to D is received individually by a light-receiving portion split into two, the focus error signal and push-pull signal can be generated by the same arithmetic process as in the case based on the conventional astigmatic method.

According to this principle, as described above, it is possible to set a region which is irradiated by only a signal light. However, for example, as understood with reference to FIG. 9B, two beams of stray light are mutually superimposed in the region proximate to the signal light. Thus, when the polarization direction of the stray light is the same, these two beams of stray light create mutual interference in the superimposed region. As a result, there may lead to a problem that the stray light amplified by the interference leads to noise by leaking into the detection region of the signal light.

Figure 11A:
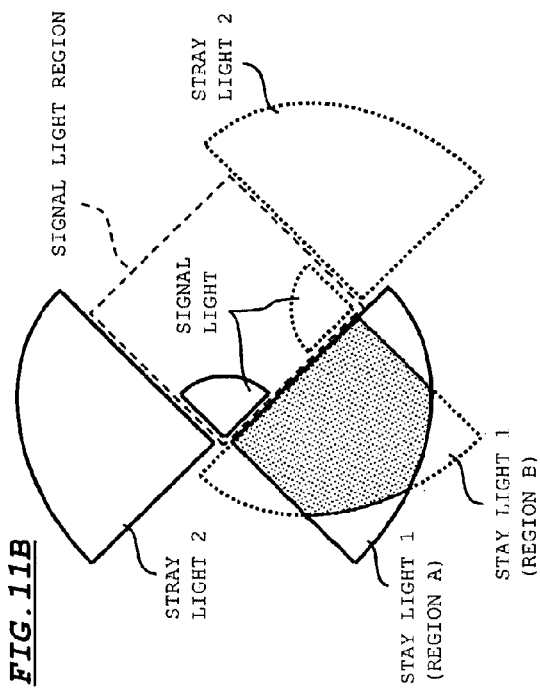
FIGS. 11A to 11D are diagrams each describing an interference between the beams of stray light, a problem of the interference (a leakage of a stray light into a signal light region), and a solution to the interference according to the embodiment.
Figure 11C:
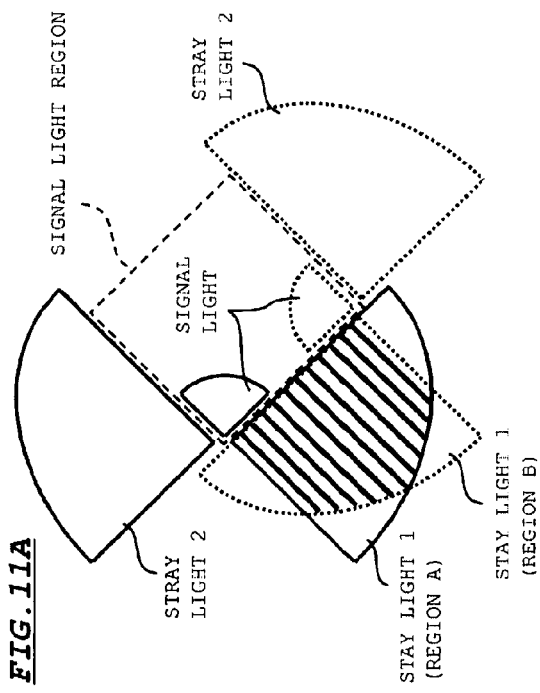

FIG. 11A is a diagram schematically showing the interference between the beams of stray light. FIG. 11C provides simulation results in which interference states between the beams of stray light are evaluated by simulating. In FIG. 11A, only a distribution state of stray light and signal light passing through a luminous flux region A and a luminous flux region B is extracted from a distribution state shown in FIG. 9B. In FIG. 11C, a stray light 2 is omitted and only an intensity distribution of a stray light 1 and a signal light is simulated. In FIG. 11C, the intensity of a central portion of the signal light takes the highest value and, in regions other than the signal light, the light intensity increases towards a black-colored portion.

Figure 12:
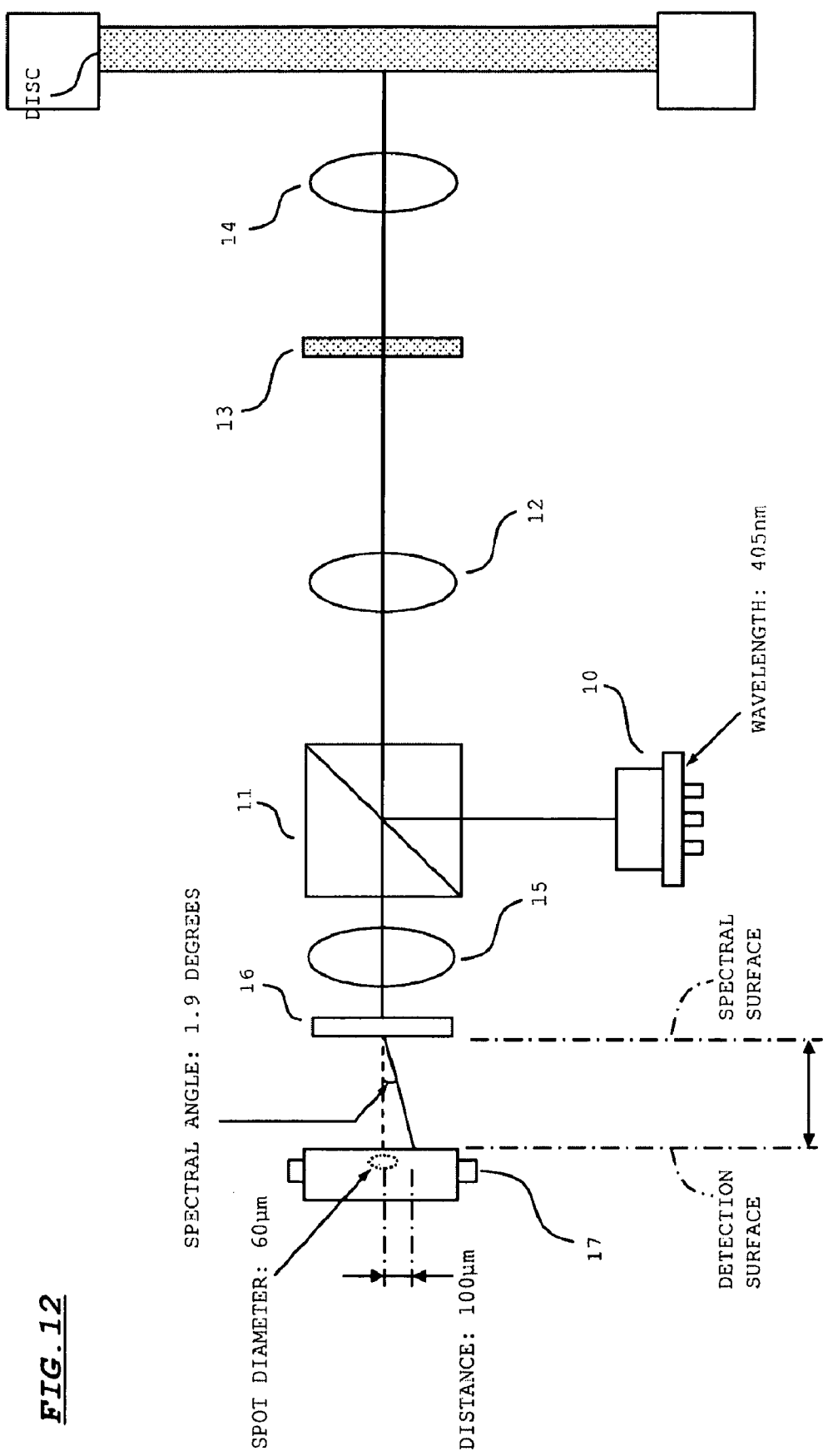
FIG. 12 is a diagram showing an optical system used for a simulation on the leakage of the stray light into the signal light region according to the embodiment.

FIG. 12 is a diagram showing an optical system used for the simulation in FIG. 11C. In FIG. 12, reference numeral 10 denotes a semiconductor laser for emitting a laser light at a wavelength of 405 nm; 11 is a polarizing beam splitter for reflecting substantially all of the laser light emitted from the semiconductor laser 10; 12 is a collimate lens for converting a laser light into a parallel light; 13 is a ¼ wavelength plate for converting a laser light (linearly polarized light) incident from the collimate lens 12 side into a circularly polarized light; 14 is an objective lens for converging a laser light onto a disc; 15 is a detection lens for introducing an astigmatism into a reflected light from the disc transmitting the polarizing beam splitter 11; 16 is an angle adjusting element for imparting an operation described with reference to the preceding FIG. 9A to a laser light; and 17 is a photodetector.

As described with reference to the preceding FIG. 9A, the angle adjusting element has an operation which mutually isolates the laser light passing through four luminous flux regions A to D so as to distribute on the light detecting surface the laser light passing through the respective luminous flux regions as shown in FIG. 9B. It should be noted that in this simulation, it is assumed that only a single recording layer (mirror surface) is present at a deeper end of the target recording layer and that there is no recording layer at a near end of the target recording layer. Thus, in the simulation, a distribution of the stray light 2 does not occur out of the distribution shown in FIG. 9B. Furthermore, an interval between the target recording layer and the deeper recording layer is taken to be 10 μm.

Design conditions for the optical system are shown as follows:
(1) Approach-route factor: 10 magnifications;
(2) Return-route factor: 18 magnifications;
(3) Spectral angle imparted by angle adjusting element 16: 1.9 degrees;
(4) Optical path length between detection surface of photodetector 17 and spectral surface of angle adjusting element 16: 3 mm;
(5) Spot diameter on light detecting surface when angle adjusting element 16 is not disposed: 60 μm; and
(6) Displacement distance for each signal light (respectively passing through luminous flux regions A to D) on the light detecting surface when angle adjusting element 16 is disposed: 100 μm.

The approach-route factor is a ratio of the focal point distance of the collimate lens to the focal point distance of the objective lens. The return-route factor is a ratio of a synthetic focal point distance of the detection lens and the collimate lens, to the focal point distance of the objective lens. In this optical system, the laser light (signal light) which is reflected by the disc forms a least circle of confusion on the detection surface when the angle adjusting element 16 is removed. The spot diameter in (5) above is the diameter of the least circle of confusion. Furthermore, the displacement distance in (6) above is a distance between an optical axial center of the signal light on the detection surface when the angle adjusting element 16 is removed and an apical position (position of the apex when a fan shape shown in FIG. 8A to FIG. 8D is a right angle) of the respective signal light when the angle adjusting element 16 is disposed.

FIG. 11C shows a distribution state of light having an intensity of at least 1/30 of the peak intensity, out of the laser light (signal light and stray light 1) irradiated onto the detection surface.

With reference to FIG. 11A, as described above, two beams of stray light 1 are mutually superimposed in the region proximate to the signal light. These two beams of stray light 1 have the same polarization direction. As a result, in the superimposed region, the two beams of stray light 1 create mutual interference and the stray light 1 produces an interference band in this region. The resulting interference band has a relatively high light intensity, as shown in FIG. 11C, and a portion thereof results in noise by leaking into the detection region (sensor region) of the signal light.

Figure 11B:
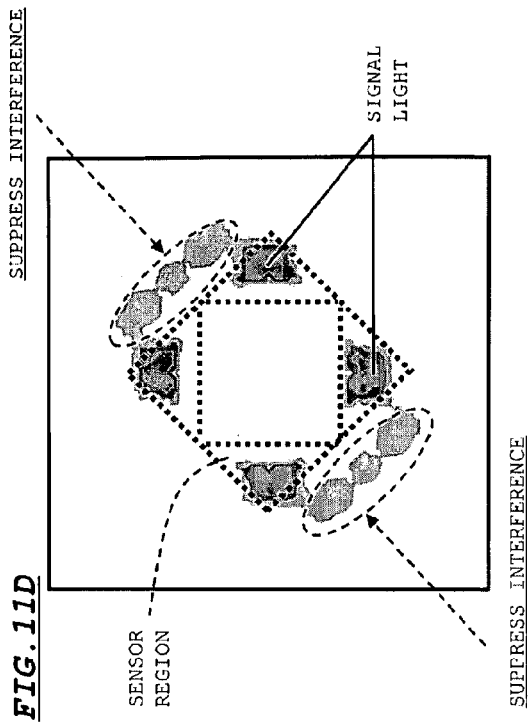
Figure 11D:
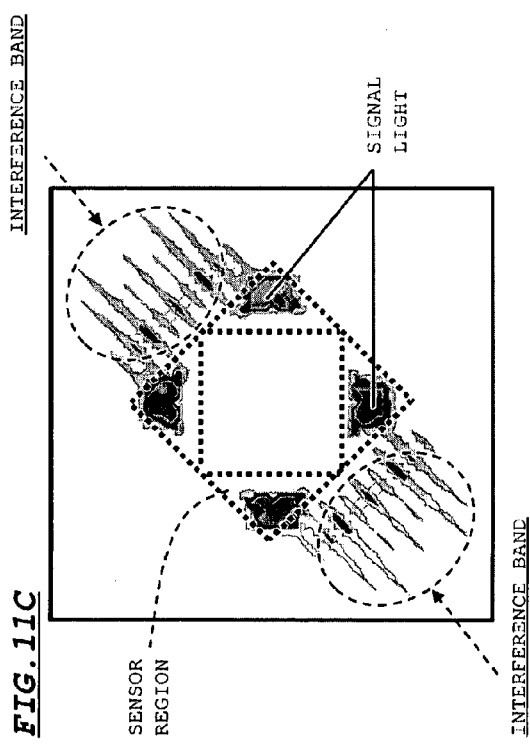

This problem can be suppressed by causing a lack of correspondence between the polarization directions of the mutually superimposed stray light 1. FIG. 11B is a diagram schematically showing a state when the polarization directions of the mutually superimposed stray light 1 are mutually set orthogonal. FIG. 11D shows results of a simulation in which the light intensity distribution on the detection surface at that time is simulated. The conditions for the simulation in FIG. 11D are the same as those in FIG. 11C with the exception that functional means for mutually setting the polarization directions of the two beams of stray light 1 orthogonal, as described above, is disposed on an incident side of the angle adjusting element 16. Similarly to FIG. 11C, FIG. 11D shows a distribution state of light having an intensity of at least 1/30 of the peak intensity, out of the laser light (signal light and stray light 1) irradiated onto the detection surface.

With reference to FIG. 11D, it can be seen that the generation of an interference band due to the stray light 1 and the leakage of the stray light relative to the detection region (sensor region) of the signal light can be suppressed by setting the polarization direction of the mutually superimposed stray light 1 orthogonal. Thus, a detection signal without noise caused by the stray light can be obtained.

Figure 13A:
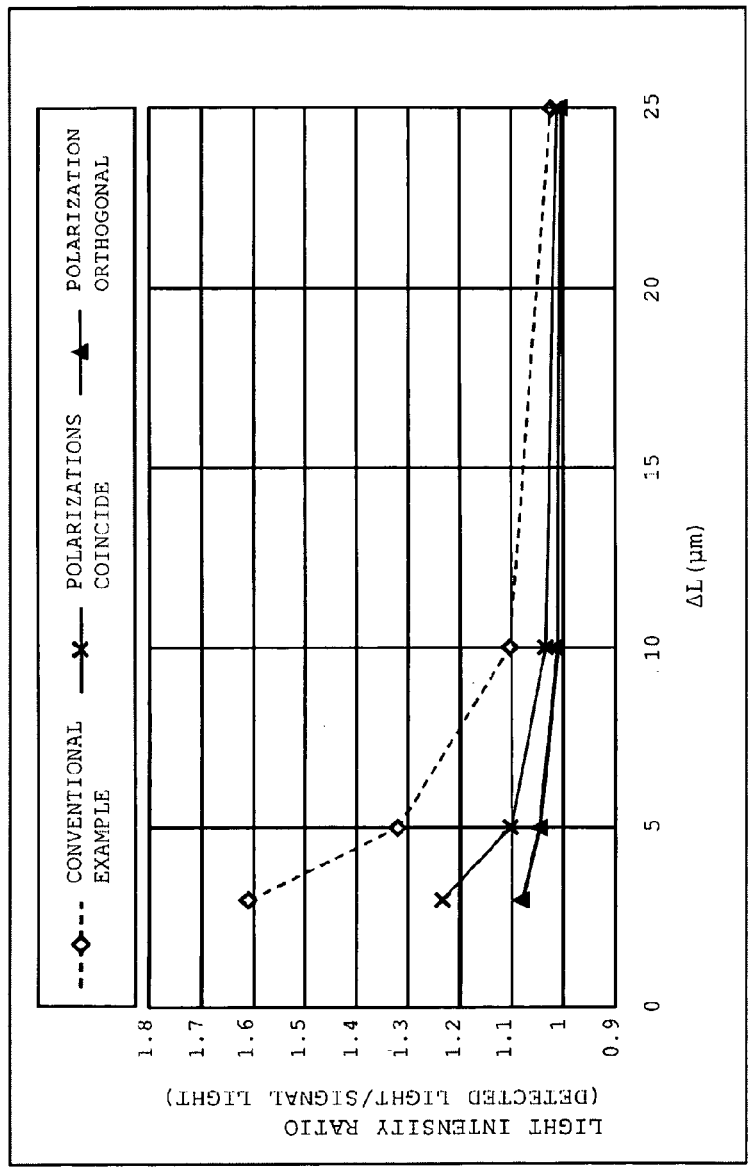
FIGS. 13A to 13C are diagrams showing simulation results of the leakage of stray light into the signal light region according to the embodiment.
Figure 13C:
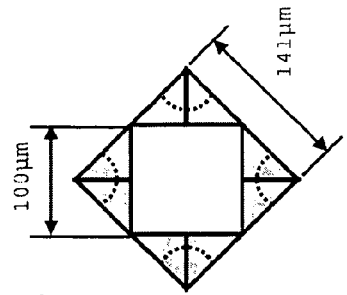

FIG. 13A shows simulation results obtained by simulating an amount of leakage of stray light 1 relative to the signal light region (see FIG. 9B) when an interval ΔL between the target recording layer and the deeper recording layer is changed under the above-described simulation conditions. A vertical axis of FIG. 13A shows a ratio (light intensity ratio) between: the amount of all light (including stray light and signal light. Hereafter, this light is referred to as "detected light") incident on the signal light region; and the amount of light of only signal light. This ratio is used as an indicator of the amount of leakage of stray light 1 relative to the signal light region. As the amount of stray light leakage increases, the light intensity ratio becomes higher. The intensity of the detected light and the signal light is a received light intensity when placing a sensor pattern as shown in FIG. 13C on the detection surface of the photodetector 17.

Figure 13B:
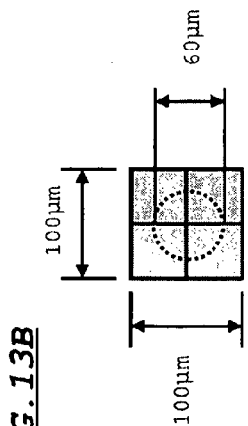

In FIG. 13A, a graph plotted with a symbol "X" shows simulation results when the polarization directions of the two mutually superimposed beams of stray light 1 coincide in the optical system in FIG. 12. A graph plotted with a symbol "▲" shows simulation results when the polarization directions for the two mutually superimposed beams of stray light 1 are set mutually orthogonal. A graph plotted with a symbol "◊" shows simulation results (in a conventional example) when the angle adjusting element 16 is omitted from the optical system in FIG. 12. The intensity of the detected light and the signal light at this time is a received light intensity when placing a sensor pattern shown in FIG. 13B on the detection surface of the photodetector 17.

It should be noted that along with the interval ΔL between the target recording layer and the deeper recording layer is changed, relative phases of the signal light and the stray light 1 vary, and as a result, the interference band resulting from the two beams of stray light 1 causes a transition which inverts (light-dark) brightness. Thus, when viewed on a micro-scale, the simulation results shown in FIG. 13A show that the light intensity ratio varies minutely along with the change in ΔL. In this case, however, in order to clearly show the amount of leakage of stray light itself, that variation is omitted from FIG. 13A, and instead, a transition of the light intensity ratio on a macro-scale is illustrated.

As understood with reference to FIG. 13A, when the above principle is used, the leakage of stray light relative to the signal light region is more suppressed as compared to the conventional example. Furthermore, when the polarization directions of the two beams of mutually superimposed stray light 1 are set orthogonal (graph plotted with the symbol "▲" in FIG. 13A), it can be seen that the leakage of stray light relative to the signal light region is more suppressed as compared to a case where the polarization direction coincides (graph plotted with a symbol "X" in FIG. 13A). In particular, when the polarization directions of the stray light 1 are set orthogonal, the leakage of stray light is conspicuously suppressed if the interval ΔL between the target recording layer and the deeper recording layer is small. Thus, when the polarization directions of the two beams of stray light 1 are set orthogonal as described above, it is possible to conspicuously suppress the influence resulting from the stray light.

Embodiment

An embodiment based on the principle will be described below.

Figure 14:
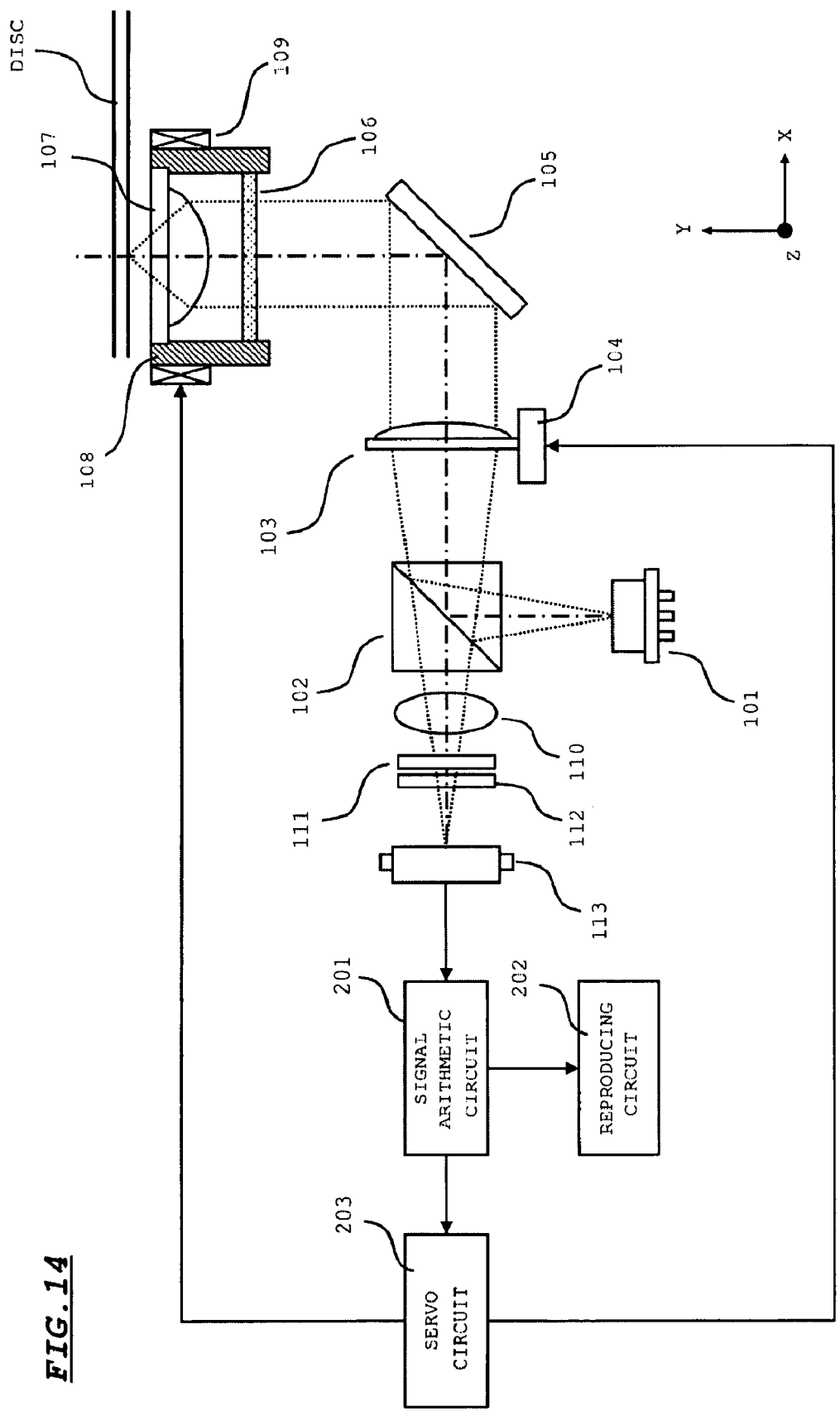
FIG. 14 is a diagram showing an optical system of an optical pickup apparatus according to the embodiment.

FIG. 14 depicts an optical system of the optical pickup apparatus according to the embodiment. It is noted that in FIG. 14, for the sake of convenience, a related circuit configuration is also shown. A plurality of recording layers are stacked and placed on a disc shown in FIG. 14.

As shown in FIG. 14, the optical system of the optical pickup apparatus is provided with: a semiconductor laser 101; a polarizing beam splitter 102; a collimating lens 103; a lens actuator 104; a startup mirror 105; a ¼ wavelength plate 106; an objective lens 107; a holder 108; an objective lens actuator 109; a detection lens 110; a polarization adjusting element 111; an angle adjusting element 112; and a photodetector 113.

The semiconductor laser 101 emits a laser light of a predetermined wavelength. The polarizing beam splitter 102 substantially completely reflects the laser light (S polarized light) entering from the semiconductor laser 101, and at the same time, substantially completely transmits the laser light (P polarized light) entering from the collimating lens 103 side. The collimating lens 103 converts the laser light entering from the polarizing beam splitter 102 side into a parallel light.

The lens actuator 104 displaces the collimating lens 103 in an optical-axis direction according to a servo signal inputted from the servo circuit 203. This corrects the aberration caused in the laser light. The startup mirror 105 reflects the laser light entering from the collimating lens 103 side in a direction towards the objective lens 107.

The ¼ wavelength plate 106 converts the laser light towards the disc into a circularly polarized light, and at the same time, converts a reflected light from the disc into a linearly polarized light perpendicularly intersecting the polarization direction at the time of heading towards the disc. Thereby, the laser light reflected by the disc is transmitted through the polarizing beam splitter 102.

The objective lens 107 is designed such that the laser light is converged properly in a target recording layer within the disc. The holder 108 holds the ¼ wavelength plate 106 and the objective lens 107 as a single piece. The objective lens actuator 109 is configured by a conventionally well-known electromagnetic driving circuit, and out of the circuit, a coil portion, such as a focus coil, is attached to the holder 108.

The detection lens 110 introduces astigmatism into the reflected light from the disc. That is, the detection lens 110 is equivalent to the astigmatic element of FIG. 1A.

The polarization adjusting element 111 adjusts the polarization direction of the laser light incident from the detection lens 110 side for each luminous flux region. That is, the polarization directions of the luminous flux, out of the laser light passing through the four luminous flux regions A to D shown in FIG. 9A, passing through the luminous flux regions adjacent in the peripheral direction are mutually set orthogonal. In other words, the polarization adjusting element 111 causes the polarization directions of the laser lights passing through the regions A and D to coincide to each other and makes the polarization directions of the laser lights passing through the regions B and C orthogonal to the polarization directions of the laser lights passing through the regions A and D.

The angle adjusting element 112 changes the advancing direction of the laser light entering from the polarization adjusting element 111 side according to the manner described with reference to FIGS. 9A and 9B. That is, the angle adjusting element 112 changes the advancing direction of the luminous flux, out of the laser light that has been entered, passing through the luminous flux regions A to D of FIG. 9A by the same angular amount α, in the directions Da to Dd, respectively. It is noted that the angular amount α is set in a manner that the distribution states of the signal light and the stray lights 1 and 2 on the surface S0 result in the distribution states in FIG. 9B.

The photodetector 113 has the sensor pattern shown in FIG. 10D. The photodetector 113 is placed in a manner that this sensor pattern is positioned at a location of the surface S0 of FIG. 1A. The eight sensors P11 to P18 shown in FIG. 10D are disposed in the photodetector 113, and each of these sensors receives the luminous flux passing through the luminous flux regions a to h of FIG. 10D.

A signal arithmetic circuit 201 performs the arithmetic process, as described with reference to FIG. 10, on the detection signals outputted from the eight sensors of the photodetector 113, and generates a focus error signal and a push-pull signal. Furthermore, the signal arithmetic circuit 201 adds up these detection signals outputted from the eight sensors to generate a reproduction RF signal. The generated focus error signal and push-pull signal are sent to a servo circuit 203, and the reproduction RF signal is sent to a reproduction circuit 202 and the servo circuit 203.

The reproduction circuit 202 demodulates the reproduction RF signal inputted from the signal arithmetic circuit 201 so as to generate reproduction data. The servo circuit 203 generates a tracking servo signal and a focus servo signal from the push-pull signal and the focus error signal inputted from the signal arithmetic circuit 201, and outputs these signals to the objective lens actuator 109. Furthermore, the servo circuit 203 outputs the servo signal in the lens actuator 104 such that the quality of the reproduction RF signal inputted from the signal arithmetic circuit 201 becomes optimum.

FIG. 15A to FIG. 15C show an example of the configuration of the polarization adjusting element 111 and the operation thereof. In this configuration example, as shown in FIG. 15B, an incident surface of the polarization adjusting element 111 is divided into four polarization adjusting regions 111a to 111d. The polarization adjusting element 111 is placed on a later stage of the detection lens 110 so that the laser light (signal light, and stray light 1 and 2) that has passed through the light flux regions A to D in FIG. 9A is incident on the polarization adjusting regions 111a to 111d, respectively.

The polarization adjusting regions 111b and 111c are transparent regions in which a polarization adjusting operation is not imparted to the laser light. The polarization adjusting regions 111a and 111d are regions having a ½ wavelength plate structure. On the polarization adjusting regions 111a to 111d, the laser light (signal light, and stray light 1 and 2) is incident in a polarization direction as shown by an arrow in FIG. 15A.

The polarization adjusting regions 111a and 111d are arranged so that an optic axis of the ½ wavelength plate structure is inclined by 45 degrees relative to the polarization direction of the incident laser light. Thus, the polarization direction of laser light portions La and Ld transmitting the polarization adjusting regions 111a and 111d is in a direction which is rotated by 90 degrees, as shown by a dashed arrow in FIG. 15C, relative to the polarization direction upon incidence. On the other hand, since the polarization adjusting regions 111b and 111c do not impart a polarization adjusting operation to the laser light, a polarization direction of the laser light portions Lb and Lc transmitting these regions maintains the polarization direction upon incidence as shown by a dashed arrow in FIG. 15C.

As a result, the polarization directions of laser light portions which are adjacent in the peripheral direction are set mutually orthogonal as shown in FIG. 15C since the laser light (signal light, and stray light 1 and 2) incident on the polarization adjusting element 111 from the detection lens 110 side transmits the polarization adjusting element 111. Furthermore, the laser light portions La to Ld in FIG. 15C correspond to the laser light passing through the four luminous flux regions A to D shown in FIG. 9A.

FIG. 15D to FIG. 15F are diagrams each showing an example of the configuration and the operation of the polarization adjusting element 111 different from those in FIG. 15A to FIG. 15C. In this configuration example, as shown in FIG. 15E, the polarization adjusting regions 111b and 111c are also regions having a ½ wavelength plate structure.

The polarization adjusting regions 111a and 111d are arranged so that an optic axis of the ½ wavelength plate structure is inclined by 67.5 degrees relative to the polarization direction of the incident laser light. Thus, in the polarization adjusting regions 111b and 111c, the optic axis of the ½ wavelength plate structure is inclined by 22.5 degrees relative to the polarization direction of incident laser light. Therefore, the polarization directions of the laser light portions La, Ld, and Lb, Lc transmitting the polarization adjusting regions 111a and 111d and the polarization adjusting regions 111b and 111c lead to directions obtained by rotating by 45 degrees in a counterclockwise and clockwise direction, respectively, relative to the polarization direction upon incidence as shown by a dashed arrow in FIG. 15F.

Due to this configuration, the laser light (signal light, and stray light 1 and 2), which is incident on the polarization adjusting element 111 from the detection lens 110 side, transmits the polarization adjusting element 111. As a result, the polarization directions of the laser light portions which are adjacent in the peripheral direction are set mutually orthogonal, as shown in FIG. 15F. Moreover, the laser light portions La to Ld in FIG. 15F correspond to the laser light passing through the four luminous flux regions A to D shown in FIG. 9A.

Figure 16A:
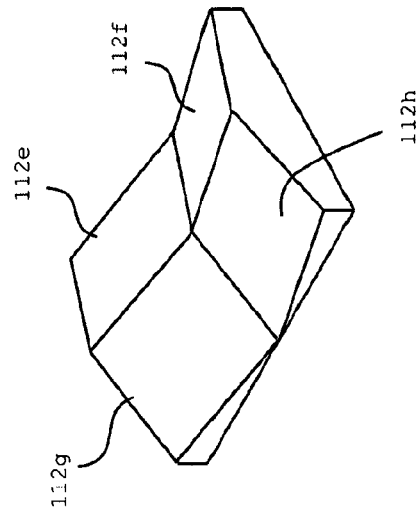
FIGS. 16A to 16C are diagrams each showing a configuration example of an angle adjusting element according to the embodiment.
Figure 16C:
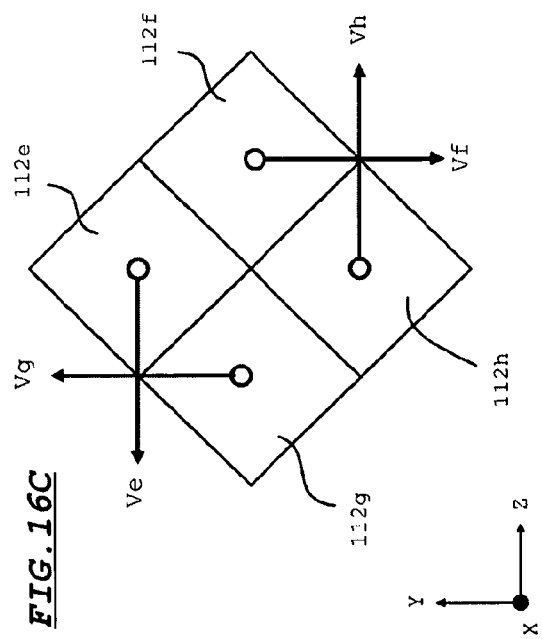
Figure 16B:
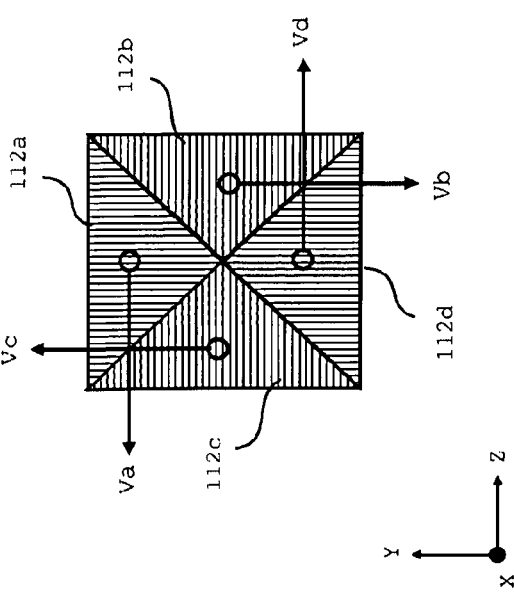

FIGS. 16A to 16C are diagrams each showing a configuration example of the angle adjusting element 112. FIG. 16A shows a configuration example in a case that the angle adjusting element 112 is configured by a hologram element having a diffraction pattern, while FIGS. 16B and 16C show configuration examples in a case that the angle adjusting element 112 is configured by a multi-faced prism.

Firstly, in the configuration example of FIG. 16A, the angle adjusting element 112 is formed by a square-shaped transparent plate, and has a hologram pattern being formed on the light-entering surface. As shown in FIG. 16A, the light-entering surface is sectioned into four hologram regions 112a to 112d. The angle adjusting element 112 is placed after the polarization adjusting element 111 so that the laser light (the signal light and the stray lights 1 and 2) passing through the luminous flux regions A to D of FIG. 9A enters in each of the hologram regions 112a to 112d.

The hologram regions 112a to 112d diffract the entered laser light (the signal light and the stray lights 1 and 2) in directions Va to Vd, respectively. The directions Va to Vd coincide with the directions Da to Dd of FIG. 9A. Thus, by means of diffraction, the hologram regions 112a to 112d change the advancing direction of the laser light (the signal light and the stray lights 1 and 2) entering from the polarization adjusting element 111 to the directions Da to Dd of FIG. 9A, respectively. A diffraction angle in each region is the same.

Herein, the diffraction angle is so adjusted that the laser light (the signal light and the stray lights 1 and 2) passing through the hologram regions 112a to 112d is distributed as shown in FIG. 9B, on the surface S0 of FIG. 1A. Thus, as described above, if the light-receiving surface of the photodetector 113 having the sensor pattern shown in FIG. 10D is placed on the surface S0, the corresponding signal light can be received properly by the aforementioned eight sensors.

At this time, the polarization directions of the two mutually superimposed beams of stray light in a distribution state as shown in FIG. 9B are set mutually orthogonal as a result of the operation by the polarization adjusting element 111. Therefore, suppression of the interference of the two beams of stray light is enabled and, as a result, as shown in the simulation above, it is possible to suppress leakage into the sensor pattern in FIG. 10D, which is caused as a result of the beams of stay light being interfered and amplified.

It is noted that the diffraction efficiency of the hologram regions 112a to 112d is the same as one another. If the hologram formed in the hologram regions 112a to 112d is of a step-like structure, the diffraction efficiency is adjusted by the number of steps of the hologram pattern and the height for each step, and the diffraction angle is adjusted by a pitch of the hologram pattern. Therefore, in this case, the number of steps of the hologram pattern and the height for each step are set so that the diffraction efficiency of a previously determined diffraction order reaches an expected value, and also, the pitch of the hologram pattern is adjusted so that the diffraction angle in the diffraction order can provide the distribution shown in FIG. 9B.

It is noted that the hologram formed in the hologram regions 112a to 112d can also be of a blaze type. In this case, a higher diffraction efficiency can be achieved as compared to the step-like structured hologram.

In the configuration example of FIG. 16B, the angle adjusting element 112 is formed by a transparent body whose light-emitting surface is plane, and the light-entering surface is individually inclined in different directions in four regions. FIG. 16C is a view of FIG. 16B as seen from the light-entering surface side. As shown in FIG. 16C, on the light-entering surface of the angle adjusting element 112, four inclined surfaces 112e to 112h are formed. If a light ray enters these inclined surfaces from the light-entering surface side, in parallel to an X-axis, the advancing direction of the light will change in the direction of Ve to Vh shown in FIG. 16C, respectively, due to the refractive effect caused when the light enters the inclined surfaces 112e to 112h. Herein, the refraction angle in the inclined surfaces 112e to 112h is the same.

The angle adjusting element 112 of FIG. 16B is placed after the polarization adjusting element 111 so that the laser light (the signal light and the stray lights 1 and 2) passing through the luminous flux regions A to D of FIG. 9A enters the inclined surfaces 112e to 112h, respectively. If the angle adjusting element 112 is placed in this way, the refraction directions Ve to Vh on the inclined surfaces 112e to 112h coincide with the directions Da to Dd of FIG. 9A. Therefore, by means of the refraction, the inclined surfaces 112e to 112h change the advancing direction of the laser light (the signal light and the stray lights 1 and 2) entering from the polarization adjusting element 111 by a constant angle into the directions Da to Dd of FIG. 9A, respectively.

Herein, the refraction angle on each inclined surface is adjusted in a manner that the laser light (the signal light and the stray lights 1 and 2) passing through the inclined surfaces 112*e* to 112*h* is distributed as shown in FIG. 9B, on the surface S0 of FIG. 1A. Thus, if the photodetector 113 having the sensor pattern shown in FIG. 10D is placed on the surface S0, the corresponding signal light can be received properly by the aforementioned eight sensors. Because such a refractive effect has a significantly small dependency on the wavelength as compared to the diffractive effect, the adaptability to a change in the wavelength of a light source or to a multi-wavelength light source is high.

It is noted that in the configuration example of FIG. 16A, the hologram regions 112*a* to 112*d* are imparted with only the diffractive effect of providing an angle for changing the advancing direction of the laser light by a constant angle. However, besides providing the angle, a hologram pattern that simultaneously exhibits an astigmatic effect caused by the detection lens 110 can also be set to the hologram regions 112*a* to 112*d*. Furthermore, it may be also possible that a hologram pattern for providing the aforementioned angle is formed on the light-entering surface of the angle adjusting element 112 and the light-emitting surface of the angle adjusting element 112 is imparted with the hologram pattern for imparting the astigmatic effect. Similarly, also in the angle adjusting element 112 of FIG. 16B, a lens surface may be formed on the light-emitting surface for introducing astigmatism. Alternatively, the inclined surfaces 112*e* to 112*h* can be shaped into curved surfaces, and the inclined surfaces 112*e* to 112*h* may be imparted with an astigmatic lens effect. In this way, the detection lens 110 can be omitted, and reductions in the number of parts and in cost can be achieved.

Thus, according to the embodiment, from among recording layers disposed in the disc, the overlapping between the signal light reflected from the target recording layer, and the stray lights 1 and 2 reflected from the recording layers present above and below the target recording layer can be prevented from overlapping one another on the light-receiving surface (the surface S0 where the signal light spot becomes a circle of least confusion at the time of on-focus) of the photodetector 113. More specifically, the distribution of the signal light and the stray lights 1 and 2 on the light-receiving surface (surface S0) can be made as shown in FIG. 9B. Therefore, by placing the sensor pattern shown in FIG. 10D in the signal light region of FIG. 9B, only the corresponding signal light can be received by the sensors P11 to P18. Thus, the degradation of the detection signal due to the stray light can be inhibited.

In addition, according to the embodiment, since the polarization directions of two beams of mutually superimposed stray light in the distribution state shown in FIG. 9B are mutually set orthogonal as a result of the operation by the polarization adjusting element 111, the interference between these two beams of stray light can be suppressed, and as a result, as shown in the simulation above, it is possible to suppress leakage into the sensor pattern shown in FIG. 10D, which is caused as a result of the beams of stay light being interfered and amplified. Therefore, further suppression of deterioration of the detection signal as a result of the stray light is enabled.

Furthermore, these effects are achieved only by placing the polarization adjusting element 111 and the angle adjusting element 112 in a light path of the laser light reflected by the disc, i.e., between the detection lens 110 and the photodetector 113 in terms of the configuration in FIG. 14. Therefore, according to the embodiment, an influence caused due to the stray light can be removed effectively with a simple configuration.

Figure 17:
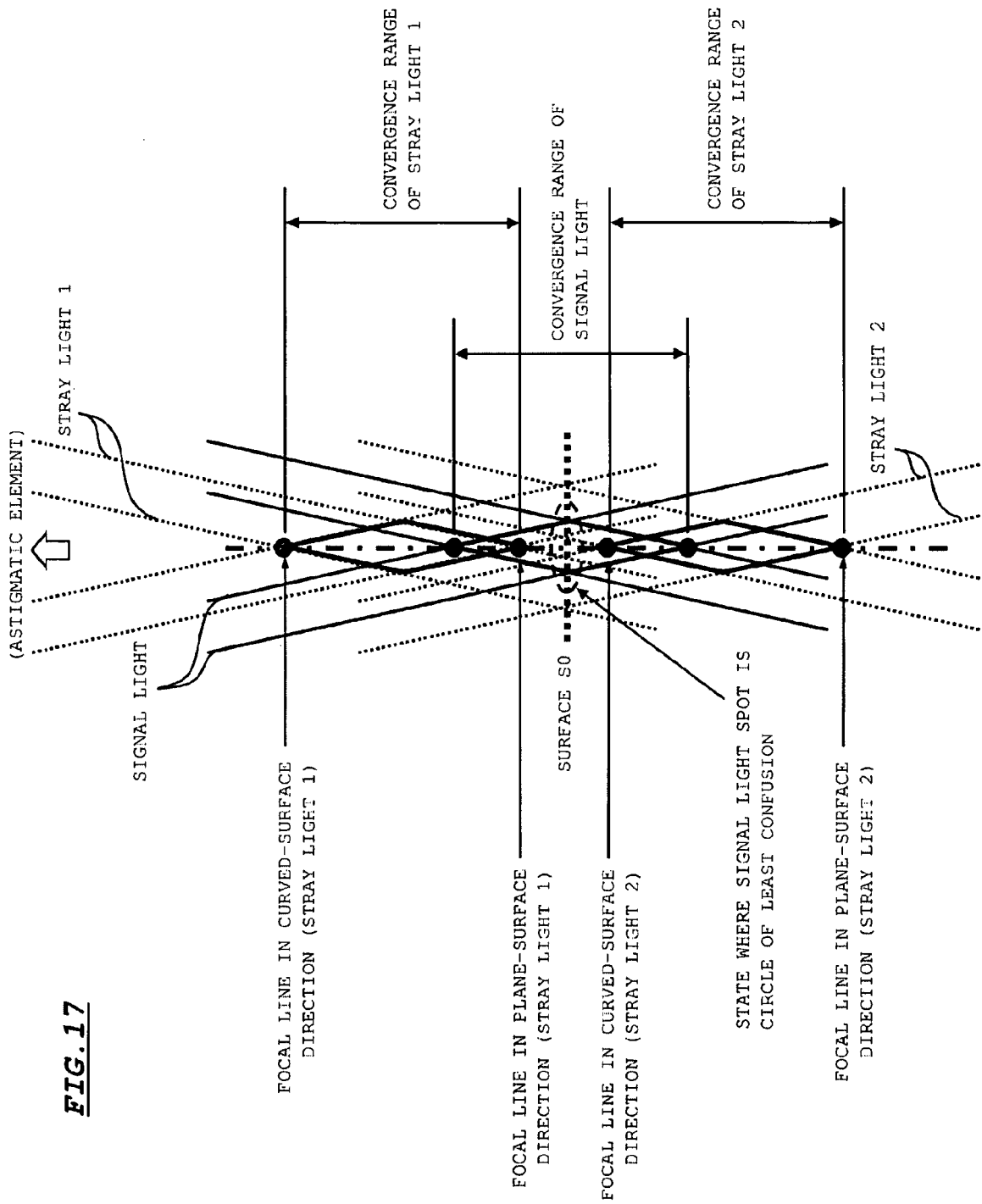
FIG. 17 is a diagram showing a preferred applicable range of the technical principle of the embodiment and the present invention.

It is noted that as shown in FIG. 17, the effect by the aforementioned principle can be demonstrated when the focal line position of the stray light 1 in the plane-surface direction is closer to the astigmatic element than the surface S0 (the surface where the signal light spot becomes a circle of least confusion), and the focal line position of the stray light 2 in the curved-surface direction is further away from the astigmatic element than the surface S0. That is, when this relationship is fulfilled, the distribution of the signal light and the stray lights 1 and 2 becomes the same state as those shown in FIGS. 8A to 8D, and the overlapping between the signal light, and the stray lights 1 and 2 on the surface S0 can be prevented. In other words, as long as this relationship is fulfilled, for example, even if the focal line position of the stray light 1 in the plane-surface direction is closer to the surface S0 than the focal line position of the signal light in the curved-surface direction, or else, even if the focal line position of the stray light 2 in the curved-surface direction is closer to the surface S0 than the focal line position of the signal light in the plane-surface direction, the effects of the present invention and the embodiment based on the aforementioned principle can be demonstrated.

The embodiment of the present invention is thus described above. However, the present invention is not limited thereto, and the embodiment of the present invention can also be modified in various ways apart from the aforementioned description.

Figure 18C:
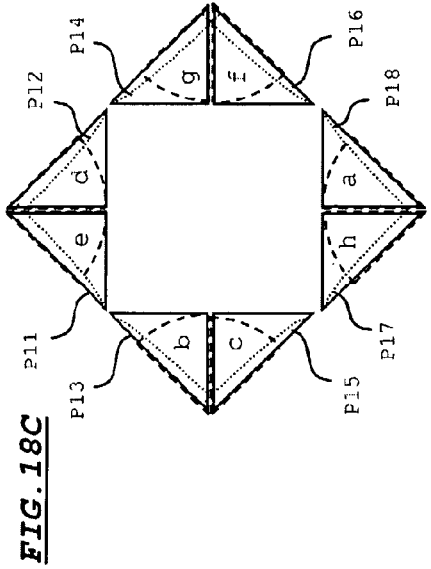
FIGS. 18A to 18D are diagrams each showing a modified example (modified mode of the sensor pattern) of the embodiment.
Figure 18D:
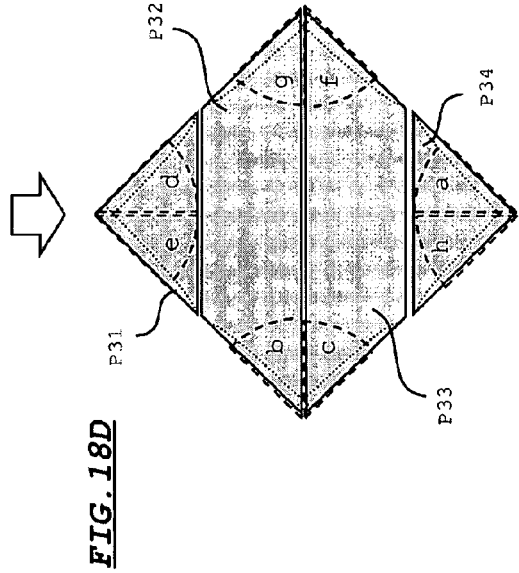
Figure 18A:
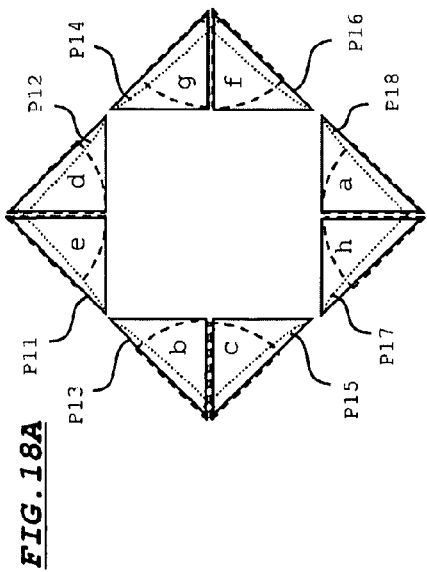
Figure 18B:
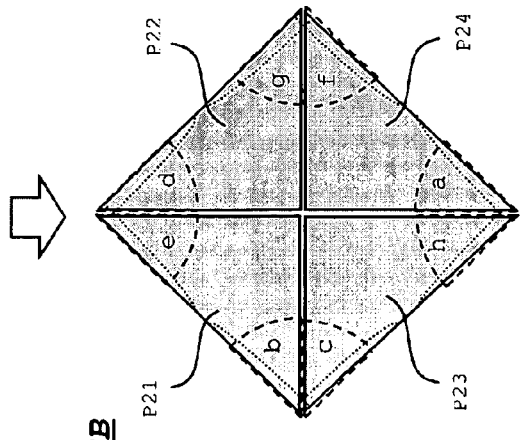

For example, in the aforementioned embodiment, the eight sensors are placed on the light-receiving surface of the photodetector 113. However, as shown in FIG. 18B, the sensors for a focus error signal can be combined together, as a single piece, to form sensors P21 to P24, and as shown in FIG. 18D, the sensors for a push-pull signal can be combined together, as a single piece, to form sensors P31 to P34. Furthermore, the shapes of the sensors P21 to P24 of FIG. 18B can also be changed as shown in FIG. 19B, or the shapes of the sensors P31 to P34 of FIG. 18D can also be changed as shown in FIG. 19D.

Figure 19C:
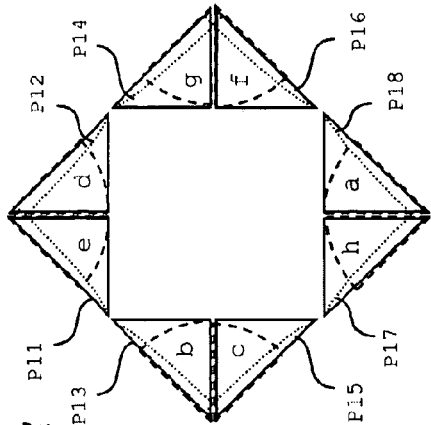
FIGS. 19A to 19D are diagrams each showing a modified example (modified mode of the sensor pattern) of the embodiment.
Figure 19D:
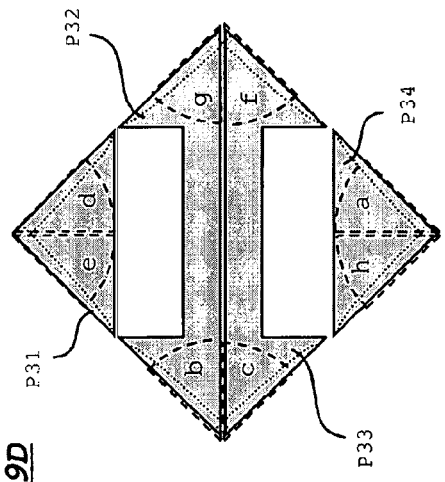
Figure 19A:
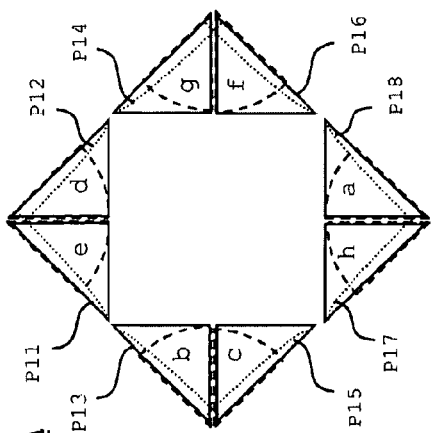
Figure 19B:
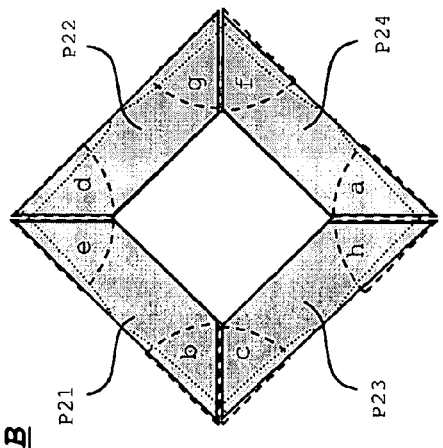
Figure 20:
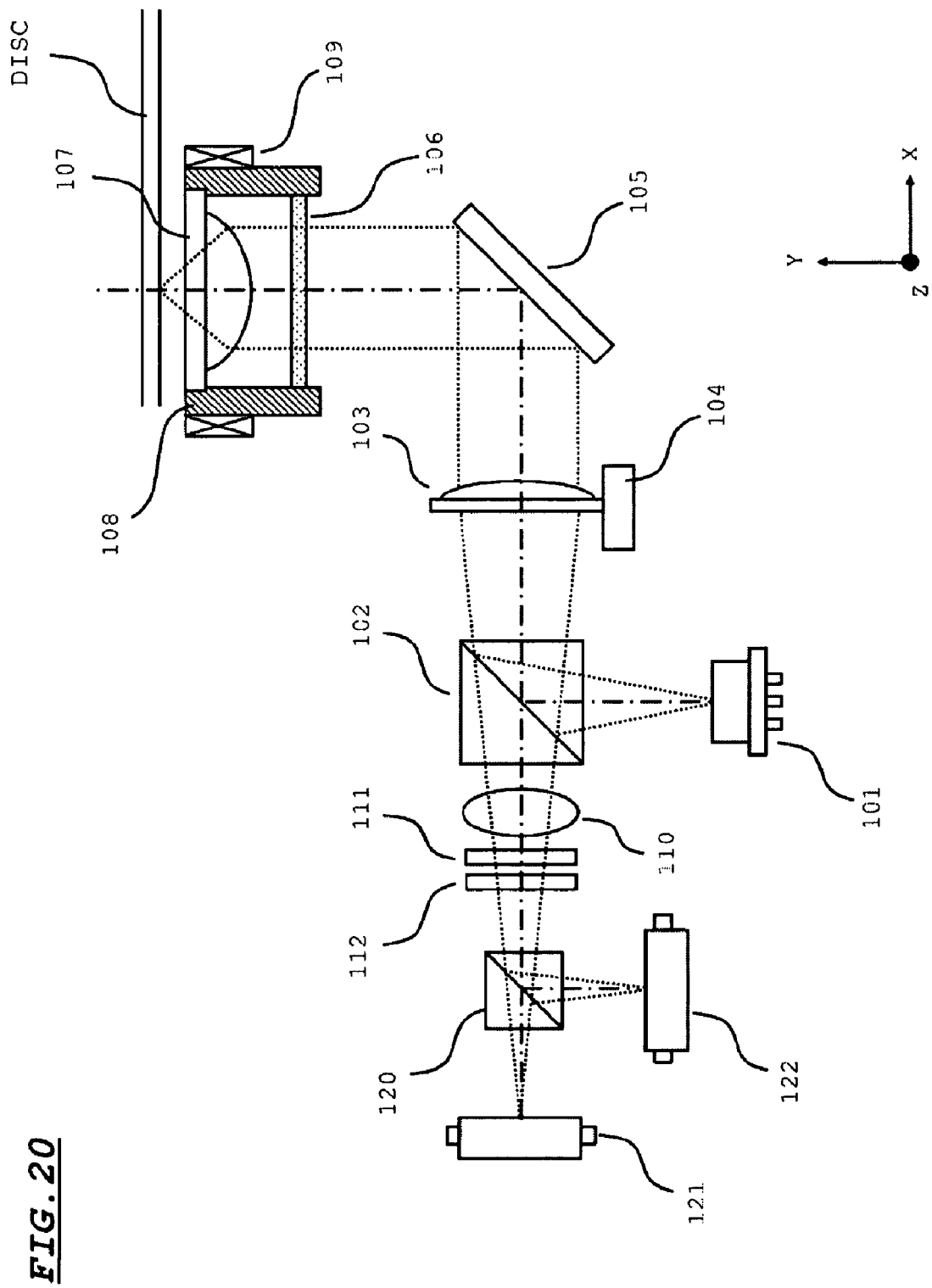
FIG. 20 is a diagram showing a modified example (modified mode of an optical system) of the embodiment.

It is noted that if the sensor pattern is to be configured as shown in FIG. 18B, 18D, 19B, or 19D, the optical system of the optical pickup apparatus needs to be changed as shown in FIG. 20. That is, in this optical system, the laser light transmitted through the angle adjusting element 112 is split by a non-polarizing beam splitter (such as a half mirror) 120, and the split laser light is received respectively by two photodetectors 121 and 122. For example, the sensor pattern shown in FIG. 18B or FIG. 19B is disposed in the photodetector 121, while the sensor pattern shown in FIG. 18D or FIG. 19D is disposed in the photodetector 122. Thus, the focus error signal is generated based on the detection signal from the photodetector 121, and the push-pull signal is generated based on the detection signal from the photodetector 122. It is noted that similar to the aforementioned embodiment, either one of the photodetectors 121 or 122 may be the sensor pattern shown in FIG. 10D.

FIGS. 21A and 21B are diagrams each showing another configuration example when two split laser lights are received individually by the sensor pattern for a focus error signal and the sensor pattern for a push-pull signal. It is noted that in FIGS. 21A and 21B, for the sake of convenience, only a configuration after the polarizing beam splitter 102 is shown.

In the configuration example of FIG. 21A, the placement of the polarization adjusting element and the angle adjusting element is changed as compared to that in FIG. 20. That is, in this configuration example, two polarization adjusting elements 131 and 133 and two angle adjusting elements 132 and 134 are disposed respectively after the non-polarizing beam splitter 120, and provide the aforementioned polarization adjusting effect and angle adjusting effect to the split laser light. Examples of the polarization adjusting element 131 and 133 include that which is configured as shown in FIGS. 15B and 15E, and examples of the angle adjusting elements 132 and 134 include that which is configured as shown in FIGS. 16A to 16C. In this case, either one of the polarization adjusting element 131 and the angle adjusting element 132 or the polarization adjusting element 133 and the angle adjusting element 134 can even be omitted. In a light path where the polarization adjusting element and the angle adjusting element is omitted, a photodetector having the sensor pattern in FIG. 10B is applied, and the focus error signal and the push-pull signal are generated by a normal arithmetic process. In this case, the stray light superimposes the signal light, thus causing the detection signal to degrade.

In the configuration of FIG. 20, the laser light is split by using the non-polarizing beam splitter. However, the laser light can also be split by using another optical means. In the configuration example of FIG. 21B, the laser light is split by using a diffraction element 141. Herein, for example, the configuration of the diffraction element 141 is such that a +1-order diffraction light is diffracted by a predetermined angle in one direction from a zero-order diffraction light. In this case, for example, in the photodetector 113, the sensor pattern shown in FIG. 18B or FIG. 19B is disposed in an irradiation position of the +1-order diffraction light, while the sensor pattern shown in FIG. 18D or FIG. 19D is disposed in an irradiation position of the zero-order diffraction light. It is noted that either one of the sensor patterns can also be the sensor pattern shown in FIG. 10D.

Herein, if the diffraction pattern is to be formed in a step-like structured hologram, then as described above, the light amount ratio of the zero-order diffraction light and +1-order diffraction light can be adjusted by adjusting the number of steps and the height for each step. It is noted that in this configuration example, the diffraction element 141 and the angle adjusting element 112 maybe combined together, as a single piece, also, the diffraction element 141, the polarization adjusting element 111, and the angle adjusting element 112 may be combined together, as a single piece. Also, if the angle adjusting element 112 is configured as shown in FIG. 16A, the hologram pattern in the diffraction element 141 is placed on the light-emitting surface of the angle adjusting element 112, or the hologram pattern on the light-entering surface can be adjusted to a pattern that simultaneously exhibits the diffractive effect in the aforementioned embodiment (angular provision in the luminous flux regions A to D) and the diffractive effect by the diffraction element 141 (splitting of the laser light). In this way, the diffraction element 141 can be omitted, the simplification of the configuration can be implemented while inhibiting a decline in the diffraction efficiency.

Furthermore, in the above-described embodiment, although the angle adjusting element 112 is placed on a later stage of the polarization adjusting element 111, the angle adjusting element 112 may also be placed on a forward stage of the polarization adjusting element 111. However, when the angle adjusting element 112 is configured by a hologram element having a diffraction pattern as shown in FIG. 16A, it is preferred as in the above embodiment that the angle adjusting element 112 is placed on a later stage of the polarization adjusting element 111. The diffraction efficiency of the hologram element changes according to a polarization direction of laser light. As in the above embodiment, when the angle adjusting element 112 is placed on a later stage of the polarization adjusting element 111, a relationship between a polarization direction of the incident laser light and a pitch direction of the diffraction pattern can be made the same relative to all hologram regions 112a to 112d. Therefore, the diffraction efficiency of the hologram regions 112a to 112d can be made the same.

It is noted that in the aforementioned embodiment, if the objective lens 107 deviates in the tracking direction, the center of the objective lens 107 deviates from the laser light axis, and an offset occurs in the push-pull signal. In this case, for example, in the sensor pattern shown in FIG. 10D, by evaluating the push-pull signal through an arithmetic operation of PP=A+H−(D+E)−k{B+G−(C+F)} (k: adjustment coefficient), an offset component of the push-pull signal occurring at the time of the tracking operation can be reduced. It is noted that if the sensor patterns of FIG. 18D and FIG. 19D are used, the arithmetic operation of A+H, D+E, B+G, and C+F can be omitted during calculation of the push-pull signal, which simplifies the arithmetic process.

Besides, the embodiment of the present invention may be modified in various ways, where appropriate, within the range of the technological idea set forth in the claims.

What is claimed is:

1. An optical pickup apparatus, comprising:
a laser light source;
an objective lens for converging a laser light emitted from the laser light source on a recording medium;
an astigmatic element for introducing an astigmatism into the laser light reflected by the recording medium so that a first focal line position occurring by the convergence of the laser light in a first direction and a second focal line position occurring by the convergence of the laser light in a second direction vertical to the first direction are mutually spaced in a propagation direction of the laser light;
an angle adjusting element for mutually contradicting propagation directions of luminous fluxes, out of the laser light reflected by the recording medium, within four different luminous flux regions so that the luminous fluxes within the four luminous flux regions are mutually dispersed;
a photodetector for outputting a detection signal when receiving each of the dispersed luminous fluxes; and
a polarization adjusting element for adjusting a polarization direction of the luminous fluxes within the four luminous flux regions; wherein
when an intersection point of two mutually crossing straight lines respectively parallel to the first direction and the second direction is matched to an optical axis of the laser light, the angle adjusting element sets the four luminous flux regions so that two of the luminous flux regions are placed in a direction in which a set of opposite angles made by the two straight lines are aligned and remaining two luminous flux regions are placed in a direction in which an alternate set of opposite angles are aligned, and
the polarization adjusting element mutually differentiates polarization directions of luminous fluxes which are selected out of the luminous fluxes within the four luminous flux regions and which are adjacent in a peripheral direction in which the optical axis of laser light serves as an axis.

2. The optical pickup apparatus according to claim 1, wherein
the four luminous flux regions are set by splitting a luminous flux region of the laser light by the two straight lines.

3. The optical pickup apparatus according to claim 1, wherein the angle adjusting element changes propagation directions of the four luminous flux regions so that each of the dispersed luminous fluxes is respectively guided to four different apical positions forming a rectangular shape on a light receiving surface of the photodetector.

4. The optical pickup apparatus according to claim 1, wherein
the photodetector has sensors for individually receiving eight split luminous flux regions formed by further splitting the four luminous flux regions along two split lines inclined by 45 degrees relative to the two straight lines.

5. The optical pickup apparatus according to claim 1, wherein
the polarization adjusting element adjusts the polarization direction of the laser light so that the polarization directions of luminous fluxes adjacent in the peripheral direction are mutually vertical.

6. The optical pickup apparatus according to claim 1, wherein
the polarization adjusting element is placed at a position more separated from the photodetector than the angle adjusting element.

7. A focal-point adjusting method for positioning a focal point position of an irradiation light on a target surface, comprising:
introducing an astigmatism into the irradiation light reflected by the target surface so that a first focal line position occurring by the convergence of the irradiation light in a first direction and a second focal line position, vertical to the first direction, occurring by the convergence of the irradiation light in a second direction are mutually spaced in a propagation direction of the irradiation light;

mutually contradicting propagation directions of luminous fluxes, out of the irradiation light reflected by the target surface, within four different luminous flux regions so that the luminous fluxes within the four luminous flux regions are mutually dispersed;

receiving each of the dispersed luminous fluxes in a photodetector; and producing a focus error signal by performing an arithmetic process based on an astigmatic method, on a detection signal outputted from the photodetector; wherein when an intersection point of two mutually crossing straight lines respectively parallel to the first direction and the second direction is matched to an optical axis of the irradiation light, the four luminous flux regions are so set that two of the luminous flux regions are placed in a direction in which a set of opposite angles made by the two straight lines are aligned and remaining two luminous flux regions are placed in a direction in which an alternate set of opposite angles are aligned, and polarization directions of luminous fluxes which are selected out of the luminous fluxes within the four luminous flux regions and which are adjacent in a peripheral direction in which the optical axis of laser light serves as an axis are mutually differentiated.

* * * * *

UNITED STATES PATENT AND TRADEMARK OFFICE
CERTIFICATE OF CORRECTION

| | | |
|---|---|---|
| PATENT NO. | : 7,916,612 B2 | Page 1 of 1 |
| APPLICATION NO. | : 12/512416 | |
| DATED | : March 29, 2011 | |
| INVENTOR(S) | : Kenji Nagatomi and Katsutoshi Hibino | |

It is certified that error appears in the above-identified patent and that said Letters Patent is hereby corrected as shown below:

In the drawings, FIG. 12, the boxes on upper and lower ends of the "DISC" should be removed:

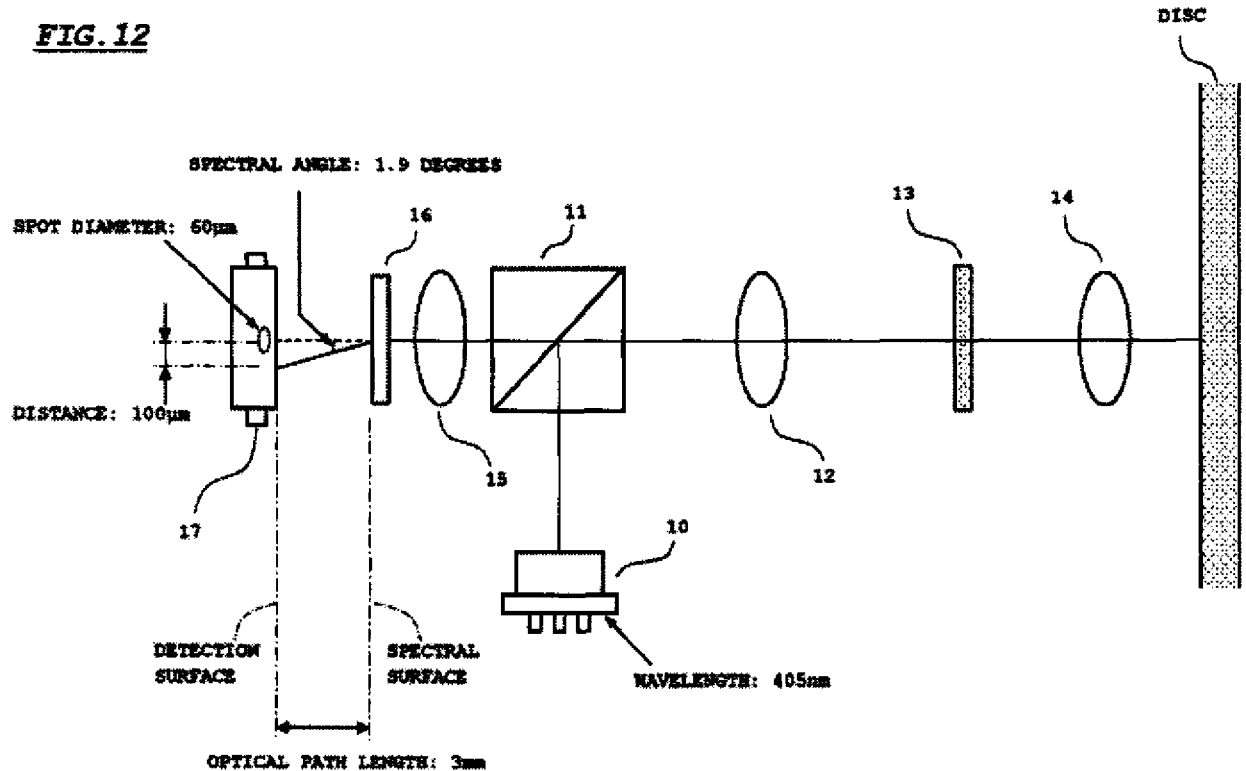

Signed and Sealed this
Fourth Day of December, 2012

David J. Kappos
*Director of the United States Patent and Trademark Office*